(12) United States Patent
Kishi et al.

(10) Patent No.: US 6,711,742 B1
(45) Date of Patent: Mar. 23, 2004

(54) CABLE MODEM SYSTEM USING CATV TRANSMISSION PATH

(75) Inventors: Tomoko Kishi, Kawasaki (JP); Takaya Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/469,125

(22) Filed: Dec. 21, 1999

(30) Foreign Application Priority Data

Dec. 21, 1998 (JP) ............................................ 10-362915

(51) Int. Cl.[7] .............................................. H04N 7/173
(52) U.S. Cl. ....................... 725/111; 725/119; 725/122
(58) Field of Search ................................ 725/111, 122, 725/123, 126, 119, 118; 370/352, 356, 401; 375/222

(56) References Cited

U.S. PATENT DOCUMENTS

| | | | | |
|---|---|---|---|---|
| 5,488,412 A | * | 1/1996 | Majeti et al. | 348/10 |
| 6,018,767 A | * | 1/2000 | Fijolek et al. | 709/218 |
| 6,163,537 A | * | 12/2000 | Thacker | 370/352 |
| 6,208,656 B1 | * | 3/2001 | Hrastar et al. | 370/401 |
| 6,480,748 B1 | * | 11/2002 | Gerszberg et al. | 700/21 |

* cited by examiner

*Primary Examiner*—Kimberly A. Williams
*Assistant Examiner*—Matthew Demicco
(74) *Attorney, Agent, or Firm*—Katten Muchin Zavis Rosenman

(57) ABSTRACT

A cable modem system prevents an up-link noise from entering a cable so as to efficiently use the bandwidth of a CATV transmission path. The cable modem system performs data communication using the transmission path of a cable television system which includes a cable television station apparatus and a plurality of subscriber units connected to each other by the transmission path. A gateway apparatus receives an original data signal supplied by one of the subscriber units via a telephone network. The gateway apparatus converts the original data signal into a converted data signal so that the converted data signal complies with a protocol corresponding to a destination address included in the original data signal. The gateway apparatus sends the converted data signal to the cable television station apparatus via the transmission path. A line end terminal unit is provided in the cable television station apparatus so as to receive the converted data signal sent from the gateway apparatus. The line end terminal unit restores the converted data signal to the original data signal.

20 Claims, 21 Drawing Sheets

FIG. 10

| USER NAME | IP ADRESS |
|---|---|
| upstream@cablemodem.fujitsu.co.jp | 172.1.1.1 |
| yamamoto@infoweb.fujitsu.co.jp | 172.10.1.1 |
| yamamoto@nifty.fujitsu.co.jp | ap.fujitsu.co.jp |
| ⋮ | ⋮ |

FIG. 11

| DIAL NUMBER | USER NAME | IP ADDRESS |
|---|---|---|
| 1111 | upstream@cablemodem.fujitsu.co.jp | 172.1.1.1 |
| 2222 | yamamoto@infoweb.fujitsu.co.jp | 172.10.1.1 |
| 2223 | yamamoto@nifty.fujitsu.co.jp | ap.fujitsu.co.jp |
| 5001 | | 192.1.1.1 |
| 5002 | | 192.1.1.2 |
| ⋮ | ⋮ | ⋮ |

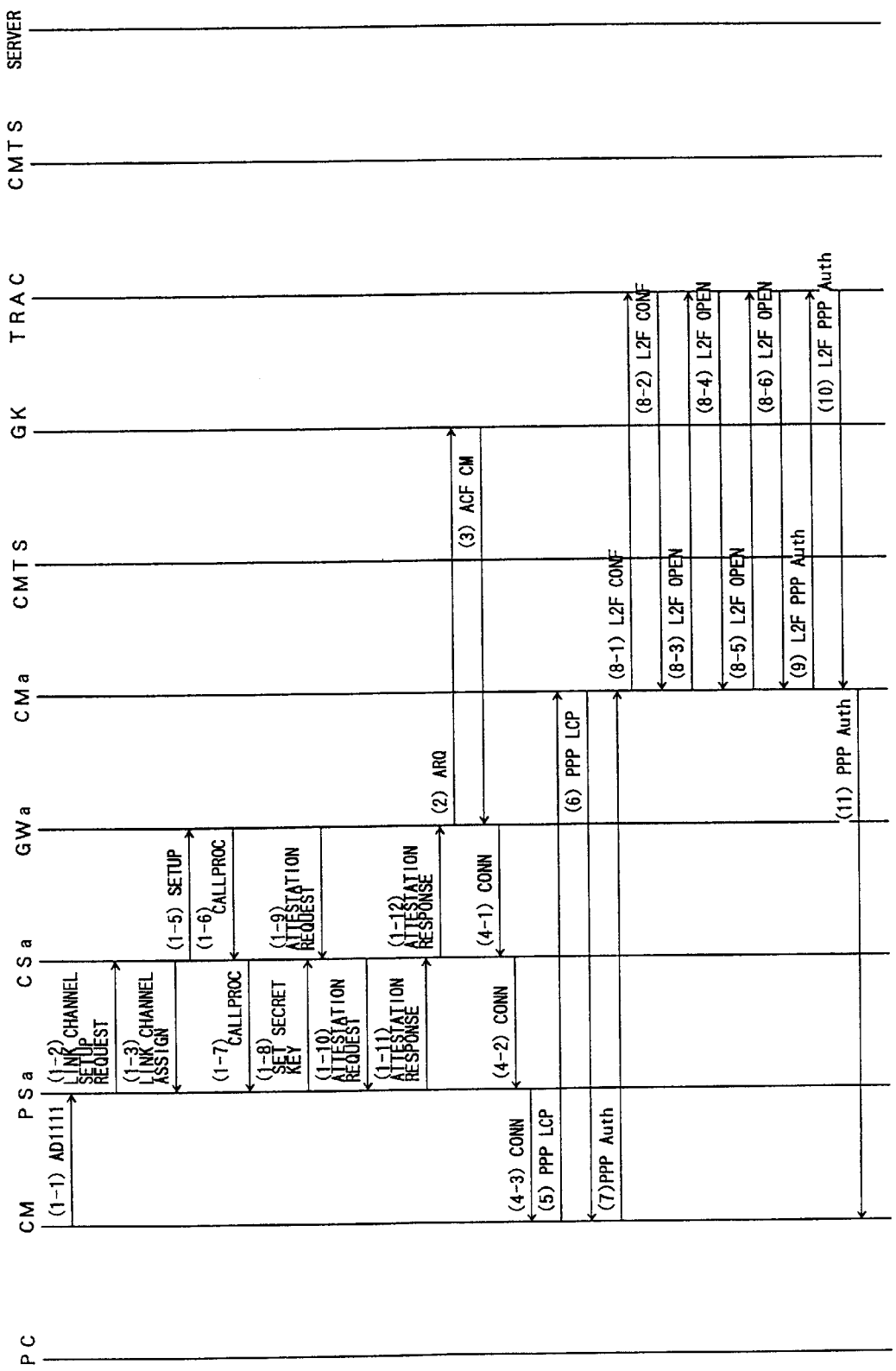

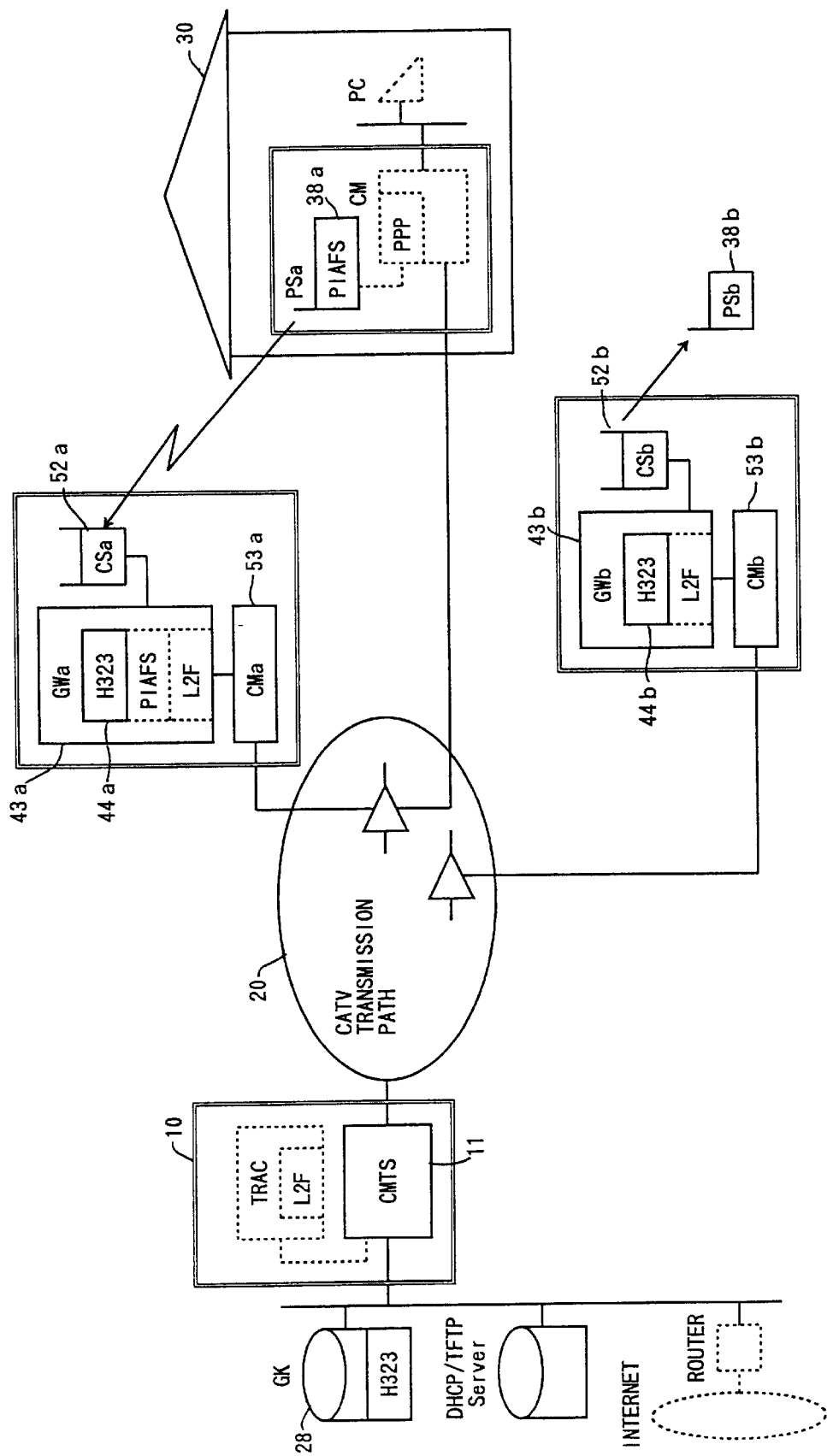

CABLE MODEM SYSTEM USING CATV TRANSMISSION PATH

BACKGROUND OF THE INVENTION

1. Field of the Invention

The present invention relates to a cable modem system and, more particularly, to a cable modem system for performing data communication by utilizing cable television (CATV) transmission path.

2. Description of the Related Art

In the cable television network, broadcasting signals are transmitted from a CATV station to each subscriber via a trunk line and a branch line. The trunk line may be a multistage tree type or a multistage star type. Since the trunk line and the branch lines are used to transmit the wide-band broadcasting signals, coaxial cables and optical fiber cables are chiefly used for the trunk line and the branch lines. Accordingly, the CATV system has a superior wide-band transmission ability.

Recently, Internet has been rapidly widespread. As a result, it is concerned to the broad-band transmission ability with an excellent CATV system. The preparation to use CATV transmission path as an access network of Internet is being advanced. Especially, standardization is being advanced by using CATV transmission path as for the cable modem system to connect the subscriber to Internet by a LAN interface. The telco return method and the 2-way method have been standardized.

In the 2-way method, the CATV transmission path is used for both the down-link to transmit signals from the CATV station to the subscriber side and the up-link to transmit signals from the subscriber side to the CATV station. Detail of the specification of the 2-way method is described in "Data-Over-Cable Service Interface Specifications, Radio Frequency Interface Specification SP-RFI-I04-980724".

In the telco return method, the CATV transmission path is used for the down-link and the public switch telephone network (PSTN) is used for the up-link. Detail of the specification of the telco return method is described in "Data-Over-Cable Service Interface Specifications, Cable Modem Telephony Return Interface Specification SP-CMTRI-I01-970804.

A description will now be given, with reference to FIGS. 1 and 2, of the 2-way method and the telco return method. FIG. 1 is a structural diagram of a cable modem system using the 2-way method. FIG. 2 is a structural diagram of a cable modem system using the telco return method.

The cable modem system shown in FIG. 1 comprises a CATV station 10, a CATV transmission path 20 and a subscriber unit 30. The CATV station 10 comprises a cable modem termination system (CMTS) 11 connected to the CATV transmission path 20 and a router 14 connected to Internet.

The CATV transmission path 20 includes a coaxial cable and an amplifier for amplifying attenuated RF signals. An optical fiber cable may be used together with the coaxial cable depending on the transmission distance. The subscriber unit 30 includes a cable modem (CM) 31 and a terminal unit 35 such as a personal computer which supports a standard Internet protocol TCP/IP. The terminal unit 35 is connected to the CATV transmission path 20 via the cable modem 31.

When the subscriber connects the terminal unit 35 to Internet, the Internet protocol (IP) packet output from the terminal unit 35 is supplied to a LAN end terminal 33 of the cable modem 31 via the LAN. The cable modem 31 converts the supplied IP packet into a multiple frame of the time division multiplexer access (TDMA) method. Thereafter, the multiple frame is digitally modulated to an RF signal by an up-link RF end terminal 32, and the RF signal is output to the CATV transmission path 20.

The RF signal output to the CATV transmission path 20 is supplied to the cable modem termination system 11 of the CATV station 10. The RF signal is then digitally demodulated by an up-link RF end terminal 12, and the multiple frame is disassembled so as to reproduce the original IP packet. The cable modem termination system 11 sends the original IP packet to Internet via the router 14.

On the other hand, an IP packet supplied from Internet is supplied to the cable modem termination system 11 via the router 14. The cable modem termination system 11 converts the supplied IP packet into a multiple frame of a time division multiplex (TDM) method. The multiple frame is digitally modulated to an RF signal by a down-link RF end terminal 13, and is output to the CATV transmission path 20. The RF signal output to the CATV transmission path 20 is supplied to the cable modem 31 of the subscriber. The RF signal is digitally demodulated by a down-link RF end terminal 34, and the multiple frame is disassembled so as to reproduce the original IP packet. The original IP packet is supplied to the terminal unit 35 via the LAN.

The cable modem system using the telco return method shown in FIG. 2 comprises the CATV station 10, the CATV transmission path 20, the subscriber 30 and a public service telephone network (PSTN) 40. In FIG. 2, parts that are the same as the parts shown in FIG. 1 are given the same reference numerals, and descriptions thereof will be omitted.

The CATV station 10 includes the cable modem termination system 11, the router 41 and a telco remote access concentrator (TRAC) 15 which is connected to the public service telephone network 40.

When the subscriber connects the terminal unit 35 to Internet, the cable modem 31 is activated by turning on a power switch. The down-link RF end terminal 34 of the cable modem 31 searches for an RF signal which is supplied from the CATV station 10 via the CATV transmission path 20 which serves as a down-link to the CATV center 10 so as to receive a dial number, a user name and a password that are necessary for the connection to Internet.

Then, a telco return end terminal 37 included in the cable modem 31 sends a call to the public service telephone network 40 by using the received dial number so as to establish a communication line to a line end functional unit 16 of the telco remote access concentrator 15.

After the communication line is established, a link is established in accordance with the point-to-point protocol (PPP) which is a standard Internet protocol for a serial connection. At this time, the user name and the password received by the down-link RF end terminal 34 of the cable modem 31 are used for attestation. By this attestation, it can be determined whether or not the subscriber is an authorized user by determining whether or not the user name has been registered.

Thereafter, the IP packet output from the terminal unit 35 is supplied to the LAN end terminal 33 of the cable modem 31 via the LAN. The IP packet is converted into an encapsulated signal in accordance with the point-to-point protocol by the telco return protocol unit 17. The encapsulated signal is supplied to a telco return end terminal 37, and is modulated to a modem signal of V.34. The modem signal is supplied to the telco remote access concentrator 15 via the public service telephone network 40.

The line end functional unit 16 of the telco remote access concentrator 15 demodulates the supplied modem signal. Thereafter, the telco return protocol unit 17 removes the encapsulation by the protocol so as to reproduce the original IP packet. The telco remote access concentrator 15 sends the reproduced IP packet to Internet via the cable modem termination system 11 and the router 14. On the other hand, the IP packet supplied by Internet is supplied to the terminal unit 35 via the CATV transmission path 20 in the same manner as that of the 2-way method.

The telco return method described with reference to FIG. 2 uses a public service telephone network for the up-link. However, a public personal handyphone system (PHS) network 50 may be used as shown in FIG. 3, or a private PHS network may be used as shown in FIG. 4.

The cable modem system using the telco return method shown in FIG. 3 uses the public PHS network for the up-link. Accordingly, the CATV station 10 is provided with a terminal adapter (TA) 18 which is compatible with the PHS Internet access forum standard (PIAFS), and the subscriber 30 is provided with a personal station (PS) 38 which is compatible with the PIAFS. Additionally, the public PHS network 50 is provided with a cell station (CS) 51 corresponding to the personal station 38.

The cable modem system using the telco return method shown in FIG. 4 uses the private PHS network for the up-link. Accordingly, the CATV station 10 is provided with a private branch exchange (PBX) 19 compatible with PHS, an RF modem 21 and a mixer 22. The subscriber is provided with the personal station 38 compatible with the PIAFS, a cell station 52 compatible with the PIAFS and an RF modem 53. Additionally, the cable modem system using the telco return method shown in FIG. 4 uses a part of the CATV transmission path 20 for the up-link. Accordingly, the RF modems 21 and 53 are provided between the cell station 52 and the private branch exchange 19.

Since the cable modem system using the 2-way method shown in FIG. 1 uses the CATV transmission path 20 for the up-link, there is a problem related to the up-link noise which is inherent to the CATV system. In the CATV system, since the CATV transmission path 20 is constructed as a multistage tree type or a multistage star type, the up-link noises entering the subscriber path to the CATV transmission path 20 are added and gathered to the CATV station 10. The up-link noise has a bandwidth corresponding to the up-link which is 10 MHz to 55 MHz in Japan and 5 MHz to 42 MHz in the United States.

Additionally, the bandwidth of the up-link is easily affected by a noise such as an electronic equipment noise in the subscriber 30, an engine spark noise of an automobile or an armature radio communication noise. Thus, when the up-link noises reach the CATV station 20, there may be a bandwidth which is not usable due to a high-level noise. Accordingly, a part of the up-link of which bandwidth is narrower than that of the down-link must be reserved for a bandwidth exclusive for the cable modem. This may be a problem in view of an efficient use of the bandwidth. Additionally, there is a problem in that a signal is destroyed by the up-link noise.

Further, in a case in which the cable modem system using the 2-way method is used in housing complex such as an apartment house, there is a problem in that a source of the up-link noise cannot be specified and, thus, it is difficult to prevent such a noise from entering the CATV transmission path 20. This is because the source of the noise does not always present in the subscriber's house. Additionally, in many cases, the mutual agreement of the entire resident is necessary for the housing complex to change the CATV transmission path to a bidirectional path.

On the other hand, according to the cable modem system using the telco return method shown in FIGS. 2 or 3, there may be no problem if the telephone cost is low. However, if the telephone cost is high and charged to the subscriber, there is a problem in that this cable modem system cannot consist as a business.

Additionally, the cable modem system using the telco return method using the private PHS network shown in FIG. 4 is provided with the RF modem between the cell station 52 which constitutes the up-link and the private branch exchange 19. Accordingly, a bandwidth must be reserved for the RF modems 21 and 53 in the bandwidth of the CATV transmission path 20 when the terminal unit 35 is not performing communication. This is a problem in view of an efficient use of the bandwidth. Especially, since a part of the bandwidth of the up-link which bandwidth is narrower than that of the down-link must be reserved exclusively for the cable modem, and considering the bandwidth lower than 30 MHz is not usable due to the up-link noise, there is a problem in that a number of cell stations 52 is limited.

SUMMARY OF THE INVENTION

It is a general object of the present invention to provide a cable modem system in which the above-mentioned problems are eliminated.

A more specific object of the present invention is to provide a cable modem system in which an up-link noise is prevented from entering a cable so as to efficiently use the bandwidth of the CATV transmission path.

It is another object of the present invention to provide a cable modem system which can reduce an initial cost charged to a subscriber.

A further object of the present invention is to provide a cable modem system which can reduce a communication cost charged to a subscriber so as to spread the cable modem system.

In order to achieve the above-mentioned objects, there is provided according to one aspect of the present invention a cable modem system performing data communication using a transmission path of a cable television system which includes a cable television station apparatus and a plurality of subscriber units connected to each other by the transmission path, the cable modem system comprising:

a gateway apparatus receiving an original data signal supplied by one of the subscriber units via a telephone network, the gateway apparatus converting the original data signal into a converted data signal so that the converted data signal complies with a protocol corresponding to a destination address included in the original data signal, the gateway apparatus sending the converted data signal to the cable television station apparatus via the transmission path; and a line end terminal unit, provided in the cable television station apparatus, receiving the converted data signal sent from the gateway apparatus via the transmission path, the line end terminal unit restoring the converted data signal to the original data signal.

In the cable modem system according to the present invention, the subscriber unit can operate based on the telco return method and the CATV station can operate based on the 2-way method. Thus, the up link noise can, be reduced. Additionally, since only a part of the CATV transmission path between the CATV station and the gateway apparatus should be changed to a bidirectional, a construction is not needed at the subscriber unit side.

Additionally, by locating the gateway apparatus at a position adjacent to the subscriber unit within a distance at which the PHS radio communication can be performed, an up link can be established on the subscriber unit side without providing an additional cable line to the subscriber unit. Additionally, the telco return line used for the up link can be provided by the CATV service supplier who provides the cable modem service, a communication cost charged to the subscriber can be reduced.

Further, by providing a gate keeper to the CATV station, the dial number and the IP address can be unitarily managed, which facilitates connection to a plurality of destination. Additionally, the contents of a table provided in each gateway apparatus which table stores information regarding dial numbers and IP addresses can be easily changed or updated.

Additionally, by providing an H.323 function unit, which supports a function according to the ITU-T recommendation H.323, each of the gateway apparatus and the CATV station, various services including the Internet connection service according to a dial up method or the telephone service using the personal handyphone system (PHS) can be provided in addition to the Internet connection service using the cable modem.

Other objects, features and advantages of the present invention will become more apparent from the following detailed description when read in conjunction with the accompanying drawings.

BRIEF DESCRIPTION OF THE DRAWINGS

FIG. 10 is an illustration for explaining contents of a table provided in a gateway apparatus of the cable modem system shown in FIG. 5;

FIG. 11 is an illustration for explaining contents of a table provided in a gate keeper of the cable modem system shown in FIG. 5;

FIGS. 13A and 13B are parts of a sequence chart of a telco return operation performed by the cable modem system shown in FIG. 12;

FIG. 16 is a structural diagram of a cable modem system according to a fourth embodiment of the present invention;

DETAILED DESCRIPTION OF THE PREFERRED EMBODIMENTS

Figure 1:
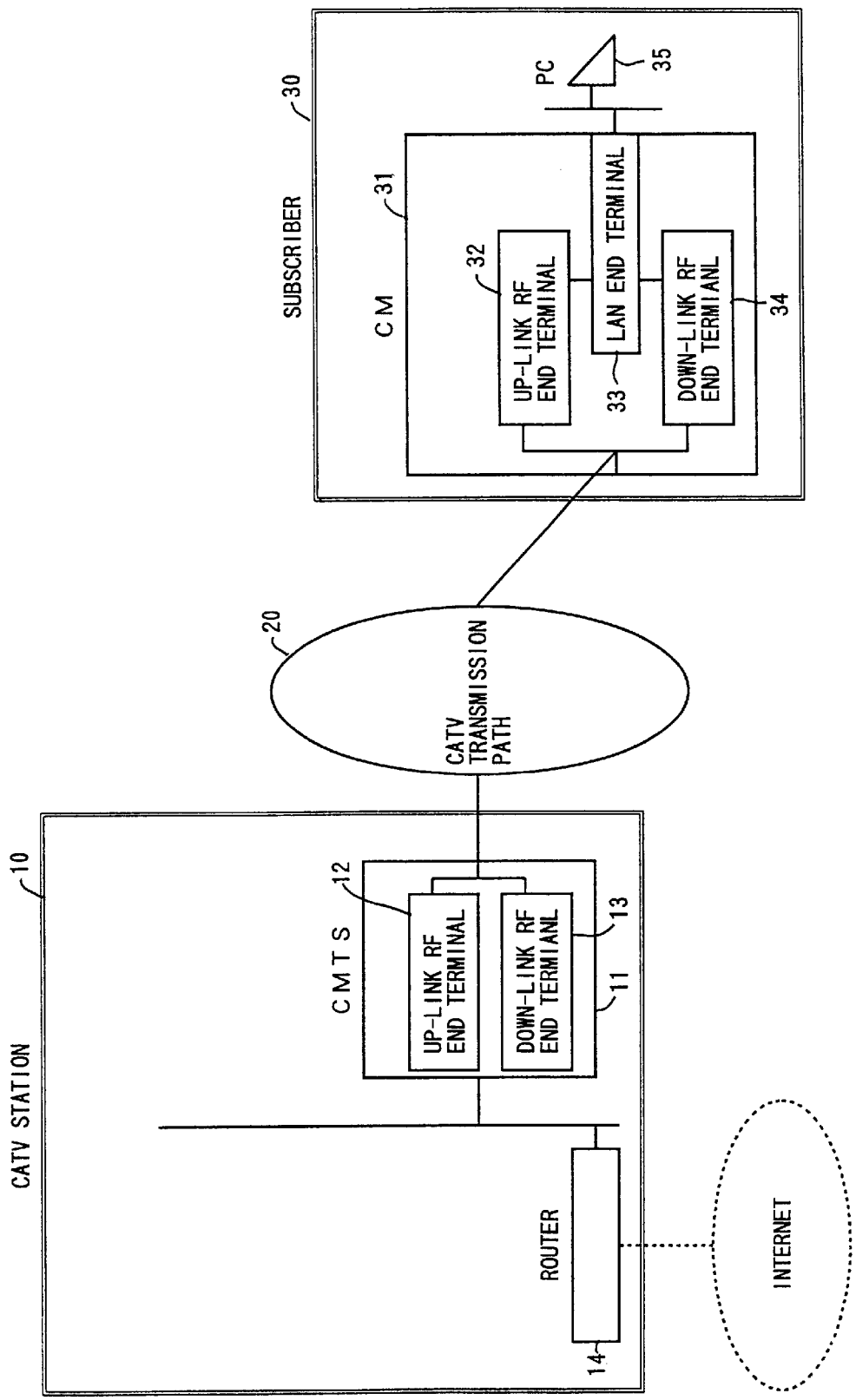
FIG. 1 is a structural diagram of a cable modem system using the 2-way method.
Figure 2:
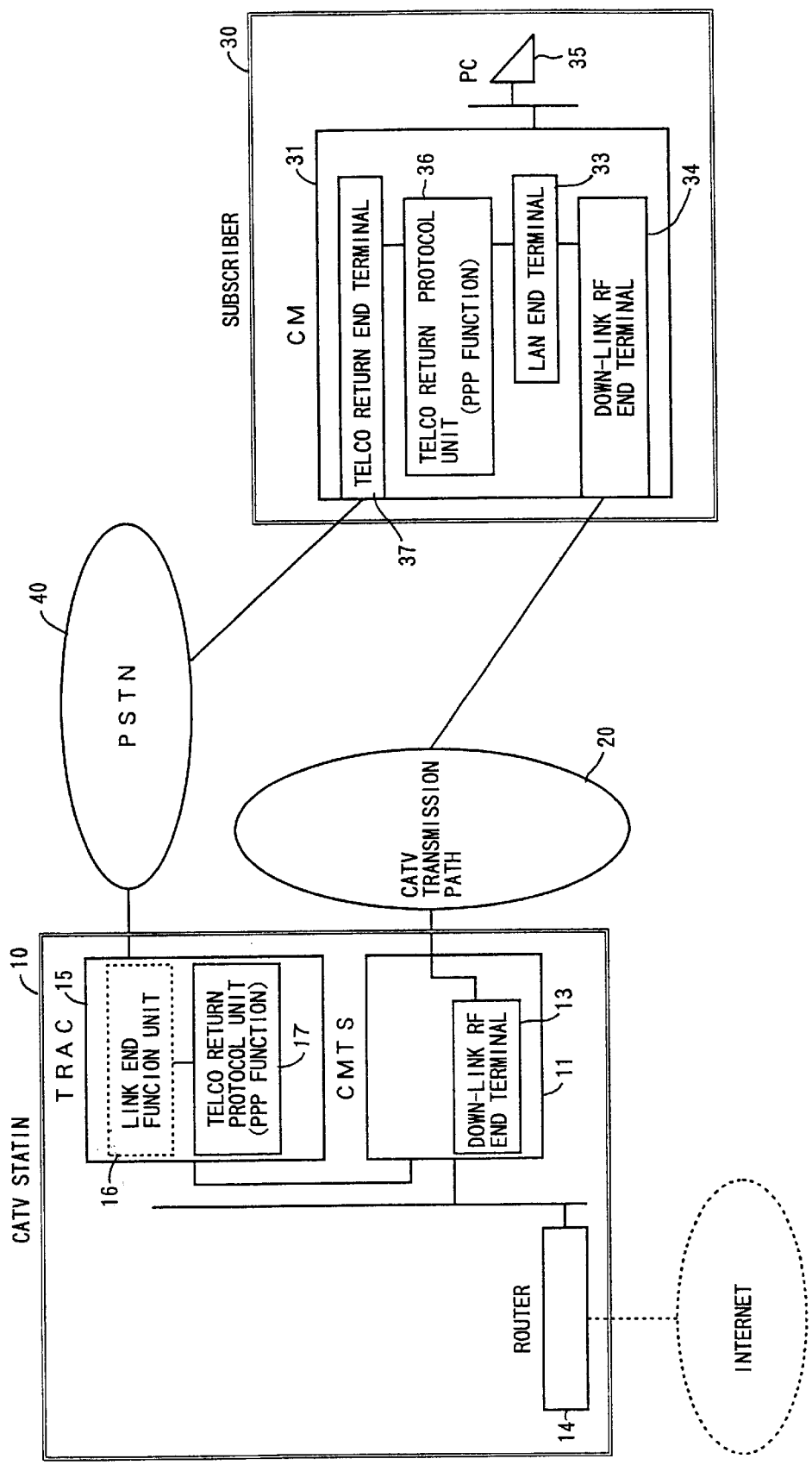
FIG. 2 is a structural diagram of a cable modem system using the telco return method.
Figure 3:
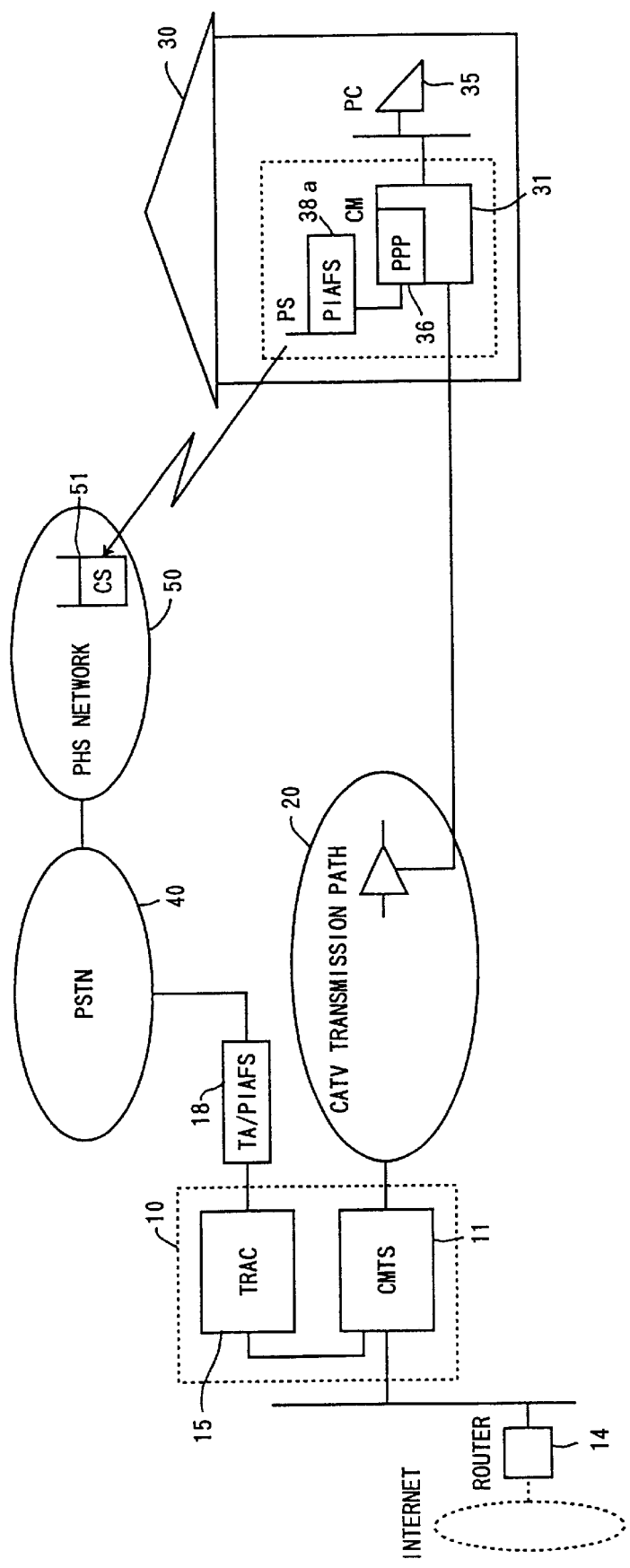
FIG. 3 is a structural diagram of a cable modem system using the telco return method using a public PHS network for an up-link.
Figure 4:
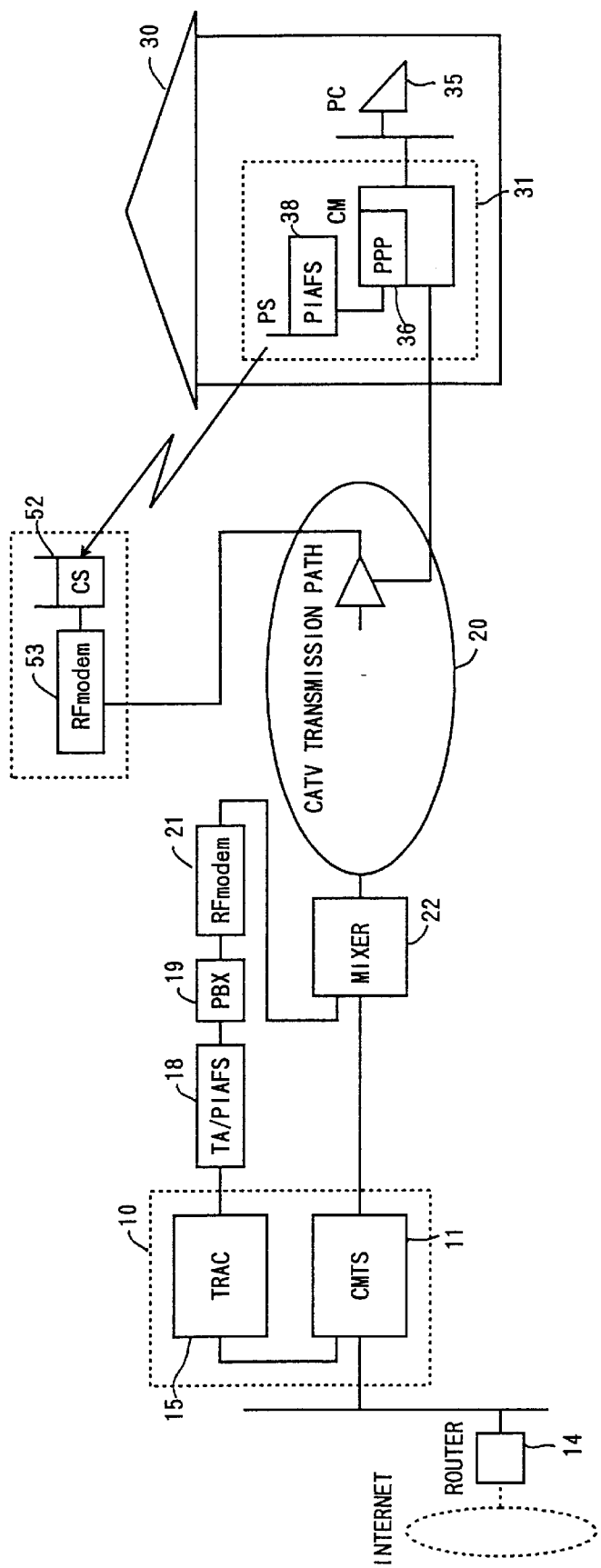
FIG. 4 is a structural diagram of a cable modem system using the telco return method using a private PHS network for an up-link.
Figure 5:
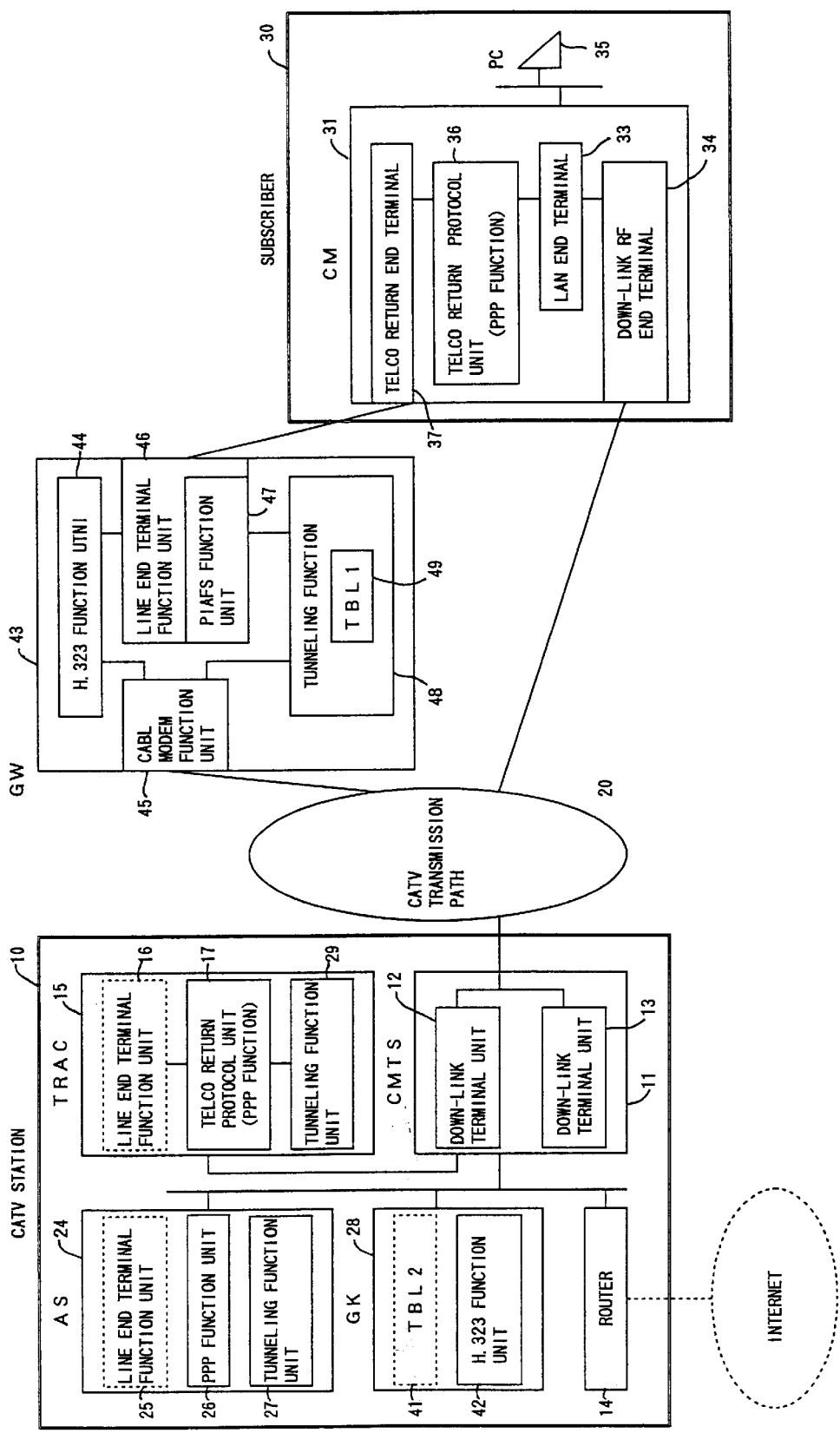
FIG. 5 is a structural diagram of a cable modem system according to a first embodiment of the present invention.

A description will now be given of a first embodiment of the present invention. FIG. 5 is a structural diagram of a cable modem system according to the first embodiment of the present invention.

The cable modem system shown in FIG. 5 comprises a CATV station 10, a CATV transmission path 20, a plurality of subscriber units 30 (only one shown in the figure) and a gateway apparatus (GW) 43.

The CATV station 10 includes a cable modem termination system (CMTS) 11 connected to the CATV transmission path 20, a router 14 connected to Internet, a telco remote access concentrator (TRAC) 15, an access server (AS) 24 and a gate keeper (GK) 28.

The CATV transmission path 20 includes a coaxial cable and an amplifier for amplifying an attenuated RF signal. An optical cable may be used together with the coaxial cable depending on the transmission distance.

The subscriber unit 30 includes a cable modem (CM) 31 and a terminal unit 35 such as a personal computer which supports a standard Internet protocol TCP/IP. The terminal unit 35 is connected to the CATV transmission path 20 and the gateway apparatus 43 via the cable modem 31.

The gateway apparatus 43 includes an H.323 function unit 44, a cable modem function unit 45, a line end terminal function unit 46, a PIAFS function unit 47 and a tunneling function unit 48. The H.323 function unit 44 is provided for using a function of the ITU-T recommendation H.323. The cable modem function unit 45 performs connection to the telco return access controller 14 in accordance with the 2-way method. The line end terminal function unit 46 performs a function of the line termination. The PIAFS function unit 47 is provided for using a personal handyphone system (PHS) as an up-link in accordance with the PHS Internet Access Forum standard (PIAFS). The tunneling function unit 48 performs an IP tunneling of the point-to-point protocol (PPP) which is a standard Internet protocol for a serial line connection.

The IP tunneling is a function to encapsulate a network protocol used in each network environment by the IP protocol when a data signal is included in an IP packet, and at the same time to improve security. As for typical tunneling functions, there are the point-to-point tunneling protocol (PPTP), the level2 forwarding protocol (L2F P) and the level2 tunneling protocol (L2TP) which combines the PPTP and the L2FP.

The tunneling function unit 48 has a table 49 which stores a user name used for attestation and an IP address of the destination of tunneling by relating to each other. The telco remote access concentrator 15 includes a tunneling function unit 29, similar to the gateway apparatus 43, so that the IP tunneling is enabled between the gateway apparatus 43 and the telco remote access concentrator 15.

Additionally, each of the gateway apparatus 43 and the gate keeper 28 includes the H.323 function unit so as to use an end point function and a gate keeper function of H.232. Specifically, the request (ARQ) message, the confirmation (ACF) message and the rejection (ARJ) message are commonly used as inquiry messages of the IP address. Especially, it can be distinguished whether the IP tunneling function is used or the H.323 function is used by answering the necessary user name for the tunneling function by using a nonstandard data field by expanding the ACF message.

It should be noted that the cable modem system shown in FIG. 5 is provided with the cable modem termination system 11 having an up-link RF end terminal unit 12 and a down-link RF end terminal unit 13 so that the 2-way method can be used. Additionally, since the subscriber unit 30 is provided with the cable modem 31 using the telco return method and an RF end terminal unit 34 which constitutes the cable modem 31 is connected to the cable modem termination system 11 via the CATV transmission path 20, the telco return method can also be used.

Figure 6:
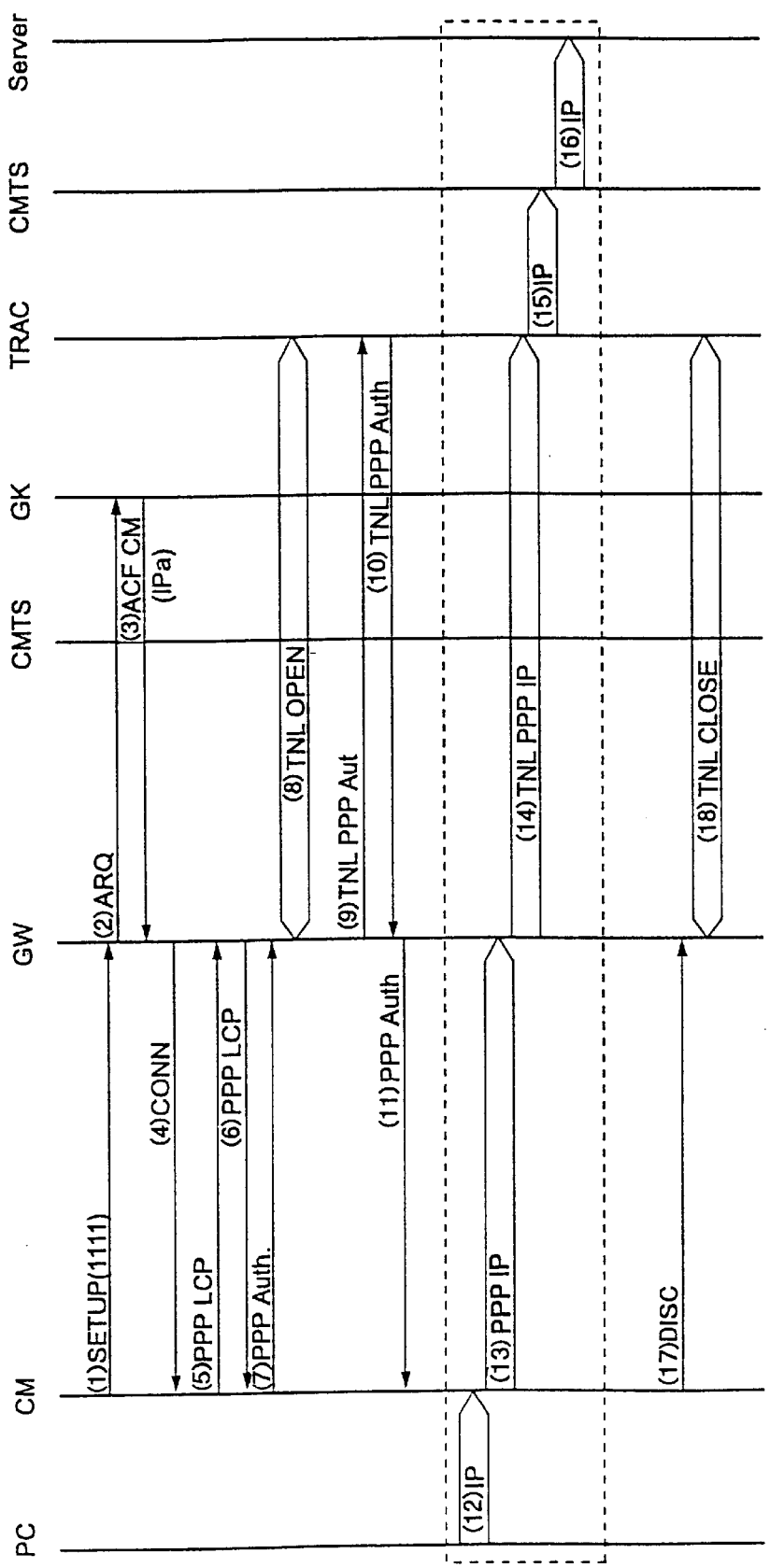
FIG. 6 is a sequence chart of a telco return operation of the cable modem system shown in FIG. 5.

A description will now be given, with reference to FIGS. 6, 7 and 8, of an operation of the cable modem system according to the first embodiment of the present invention. FIG. 6 is a sequence chart of a telco return operation of the cable modem system shown in FIG. 5.

When the user of the subscriber unit 30 connects the terminal unit 35 to Internet, the cable modem 31 is activated by turning on a power switch. The RF end terminal unit 34 searches for an RF signal supplied from the CATV station 10 via the CATV transmission path 20 so as to receive information necessary for the Internet connection such as a dial number, a user name or a password.

The telco return end terminal unit 37 of the cable unit 31 calls the gateway apparatus 43 by using the received dial number, for example, "1111" ((1)SETUP(1111)). Upon receipt of the dial number "1111", the gateway apparatus 43 sends the ARQ message to the gate keeper 28 of the CATV station 10 in order to inquire about the user name and the IP address of the telco remote access concentrator 15 corresponding to the dial number ((2)ARQ).

Upon receipt of the ARQ message from the gateway apparatus 34, the gate keeper 28 searches a table 41 for the user name and the IP address corresponding to the dial number "1111", the table 41 storing dial numbers, user names and IP addresses by relating to each other as shown in FIG. 11.

For example, when the user name and the IP address corresponding to the dial number "1111" are searched for from the table 41 shown in FIG. 11, the IP address "172.1.1.1" is retrieved as a result of the search.

It should be noted that if the dial number "1111" is not registered, the ARJ message is sent to the gateway apparatus 43 by providing a reason for the rejection in a called party not registered field of the ARJ message (this process is not shown in the sequence chart of FIG. 6).

If the dial number "1111" is registered in the table 41, the gate keeper 28 sends an ACF_CM message to the gateway apparatus 43 after providing the IP address in a dest call signal address field of the ACF_CM message and providing the user name in a nonstandard parameter field of the ACF_CM message ((3)ACF_CM). It should be noted that if the dial number "1111" corresponds to the telco remote access concentrator 15 or the access server 24, the user name indicating such correspondence is provided in the table 41.

Upon receipt of the ACF_CM message, the gateway apparatus 43 registers or updates the user name and the IP address corresponding to the dial number "1111" in a table 49 provided in the tunneling function unit 48 which table 49 stores the user name and the IP address by relating to each other as shown in FIG. 10. After the registration or update, the gateway apparatus 43 sends to the cable modem 31 a CONN message which represents completion of the connection ((4)CONN).

Upon receipt of the CONN message, the cable modem 31 sends to the gateway apparatus 43 a PPP LCP message to start a negotiation of a link control protocol (LCP) to establish a link in accordance with the standard protocol PPP ((5)PPP LCP). Upon receipt of the PPP LCP message, the gateway apparatus 43 sends the PPP LCP message to the cable modem 31 ((6)PPP LCP), and the negotiation is ended. It should be noted that the negotiation means an adjustment of attestation of the protocol between the gateway apparatus 43 and the cable modem 31. In this case, the negotiation is completed by a single adjustment.

After the negotiation of the LCP is completed, the cable modem 31 sends to the gateway apparatus 43 a PPP Auth message which is information regarding attestation including the user name and the password in order to perform the attestation ((7)PPP Auth). Upon receipt of the PPP Auth message, the gateway apparatus 43 searches the table 49 for the IP address of the telco remote access concentrator 15 in accordance with the received user name. Then, the gateway apparatus 43 starts a negotiation to establish an IP tunneling between the gateway apparatus 43 and the telco remote access concentrator 15 ((8)TNL OPEN).

After the negotiation is completed and the IP tunneling is established, the gateway apparatus 43 sends to the telco remote access concentrator 15 a TNL_PPP Auth message which is information regarding attestation ((9)TNL PPP Auth). Upon receipt of the TNL_PPP Auth message, the telco remote access concentrator 15 performs attestation by using the user name and the password included in the TNL_PPP Auth message, and sends the result of attestation to the gateway apparatus 43 as the TNL_PPP Auth message ((10)TNL PPP Auth). Then, the gateway apparatus 43 sends the PPP Auth message to the cable modem 31, and, thereby, an up-link is established.

Thereafter, the IP packet output from the terminal unit 35 is sent to Internet via the cable modem 31, the gateway apparatus 43, the CATV transmission path 20, the telco remote access concentrator 15, the cable modem termination system 11 and the router 14 ((12)IP, (13)PPP IP, (14)TNL PPP IP, (15)IP, (16)IP). Additionally, the IP packet sent from Internet is supplied to the CATV station 10 via the router 14, and the IP packet is sent to the terminal unit 35 via the cable modem termination system 11, the CATV transmission path 20 and the cable modem 31. By repeating the above-mentioned sequence, the Internet connection is established.

After the user operates the terminal unit 35 to disconnect the Internet connection, the cable modem 31 sends a disconnect (DISC) message to the gateway apparatus 43 ((17) DISC). Upon receipt of the DISC message, the gateway apparatus 43 disconnects the IP tunneling between the gateway apparatus 43 and the telco remote access concentrator 15 ((18)TNL CLOSE). It should be noted that the gateway apparatus disconnects the IP tunneling when the link of the LCP is disconnected.

Figure 9:
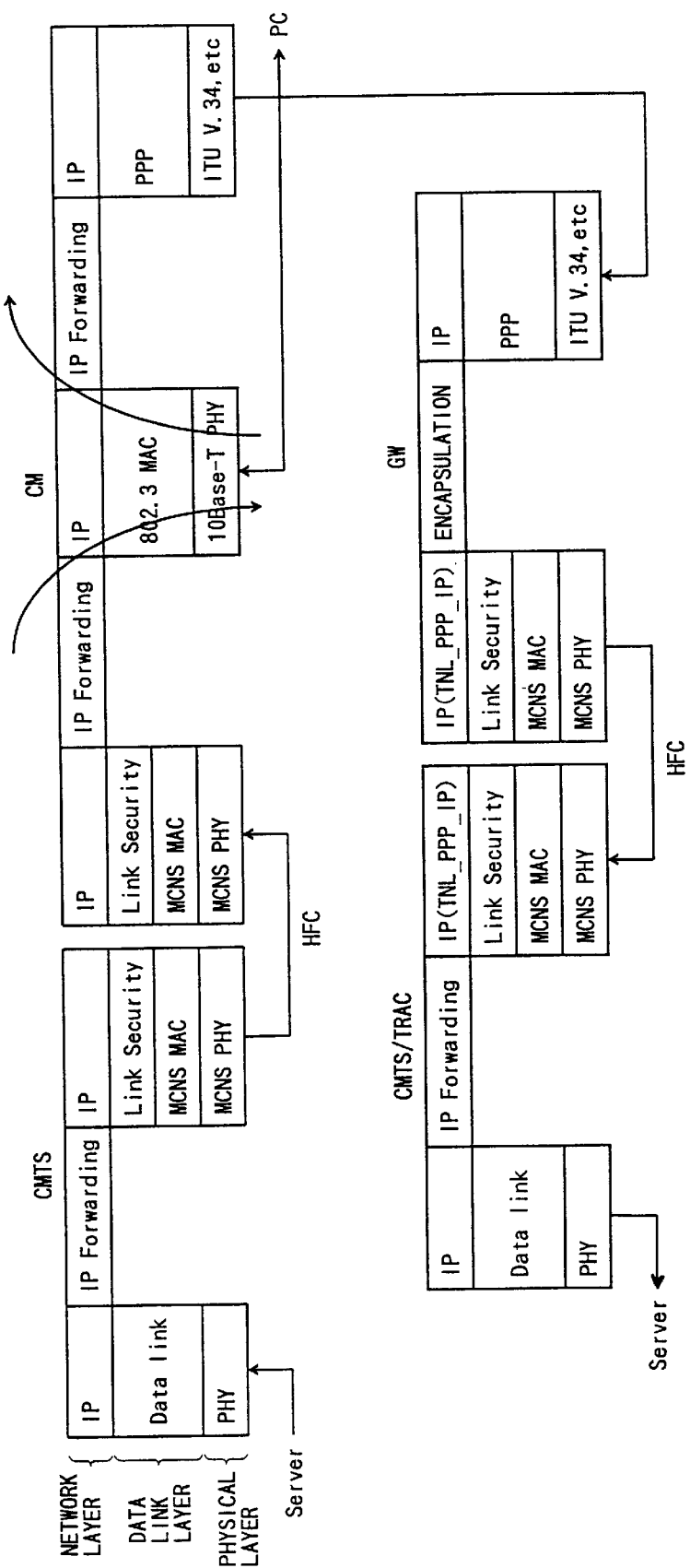
FIG. 9 is an illustration for explaining a protocol process.

A description will now be given, with reference to FIG. 9, of a protocol process. FIG. 9 is an illustration for explaining a protocol process. The protocol structure shown in FIG. 9 comprises a network layer, a data link layer and a physical layer in that order from the top. It should be noted that contents of FIG. 9 are almost the same as the contents of the sequence chart of FIG. 6, and only an outline will be described.

When sending an IP packet to Internet, the terminal unit 35 sends the IP packet to the cable modem 31. Upon receipt of the IP packet, the cable modem 31 produces a PPP_IP packet by encapsulating the IP packet by the pint-to-point protocol (PPP), and sends the PPP_IP packet to the gateway apparatus 43. Then, the gateway apparatus 43 encapsulates the PPP_IP packet to produce a TNL_PPP_IP packet so as to use the tunneling function, and sends the TNL_PPP_IP packet to the telco remote access concentrator 15.

The telco remote access concentrator 15 removes the encapsulation of the received TNL_PPP_IP packet by the tunneling and PPP function, and sends only the IP packet to the cable modem termination system 11. The cable modem termination system 11 sends the received IP packet to Internet.

A description will now be given, with reference to FIG. 7, of a connecting operation by an access server which provides the Internet connection by a dial-up method. FIG. 7 is a sequence chart of a connecting operation by the access server provided in the cable modem system shown in FIG. 5. In this case, it is assumed that the cable modem 31 is not provided to the subscriber unit 30, and the terminal unit 35 is connected to the gateway apparatus 43 without the cable modem 31.

A description will be given of a case in which the user connects the terminal unit 35 to Internet. The terminal unit 35 stores information regarding a dial number, a user name and the password in a storage means such as a hard disk drive which information is necessary for the Internet connection using a dial-up method. The terminal unit 35 also has the PPP function.

The terminal unit 35 calls the gateway apparatus 43 by using a dial number, for example, "2222" stored in the storage means ((1)SETUP(2222)). Upon receipt of the dial number "2222", the gateway apparatus 43 sends an ARQ message to the gate keeper 28 of the CATV station 10 in order to inquire about the user name and the IP address of the telco remote access concentrator 15 corresponding to the dial number ((2)ARQ).

Upon receipt of the ARQ message from the gateway apparatus 43, the gate keeper 28 searches a table 41 for the user name and the IP address corresponding to the dial number "2222", the table 41 storing dial numbers, user names and IP addresses by relating to each other as shown in FIG. 11.

Figure 7:
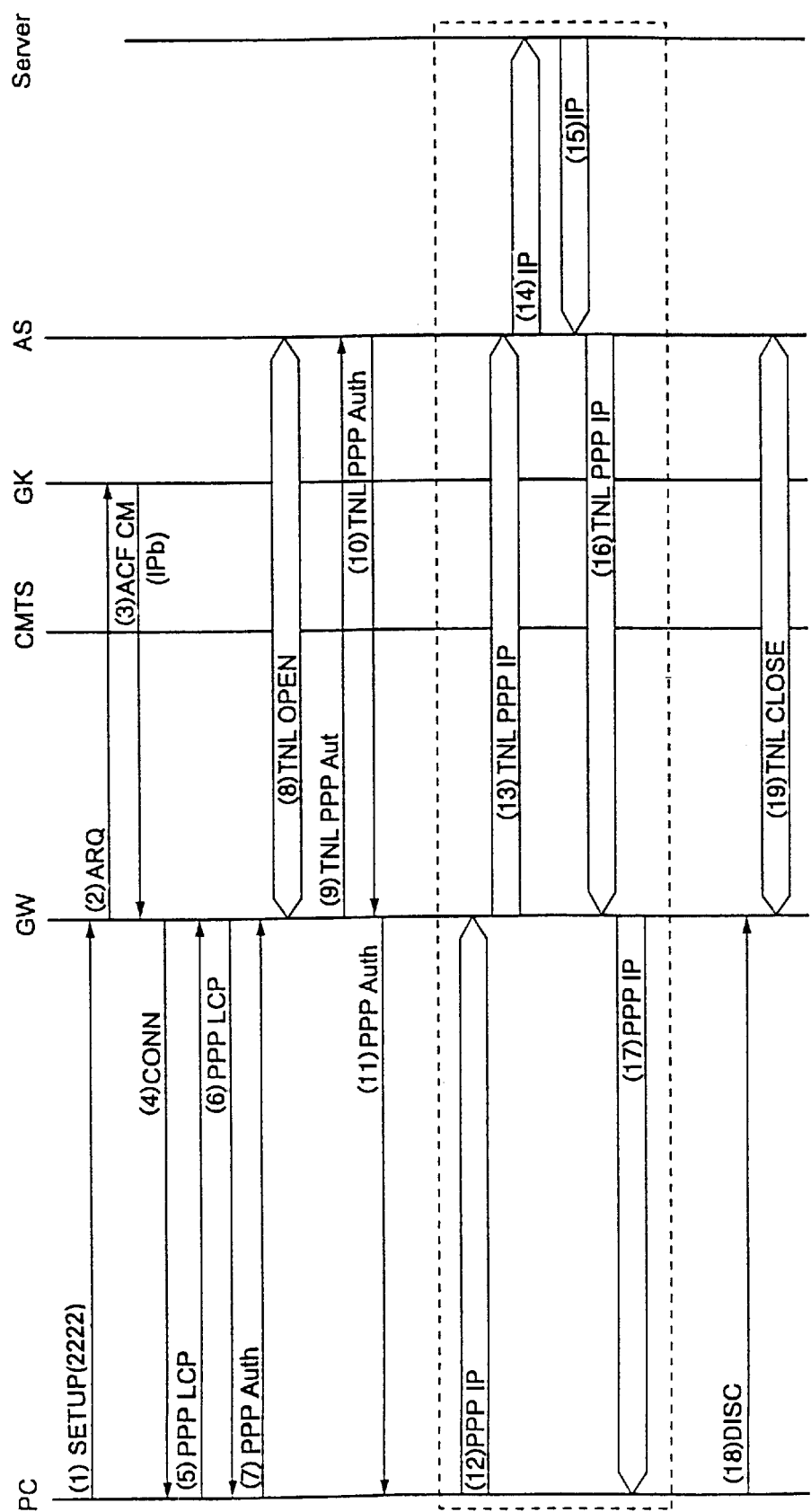
FIG. 7 is a sequence chart of a connecting operation by an access server of the cable modem system shown in FIG. 5.
Figure 8:
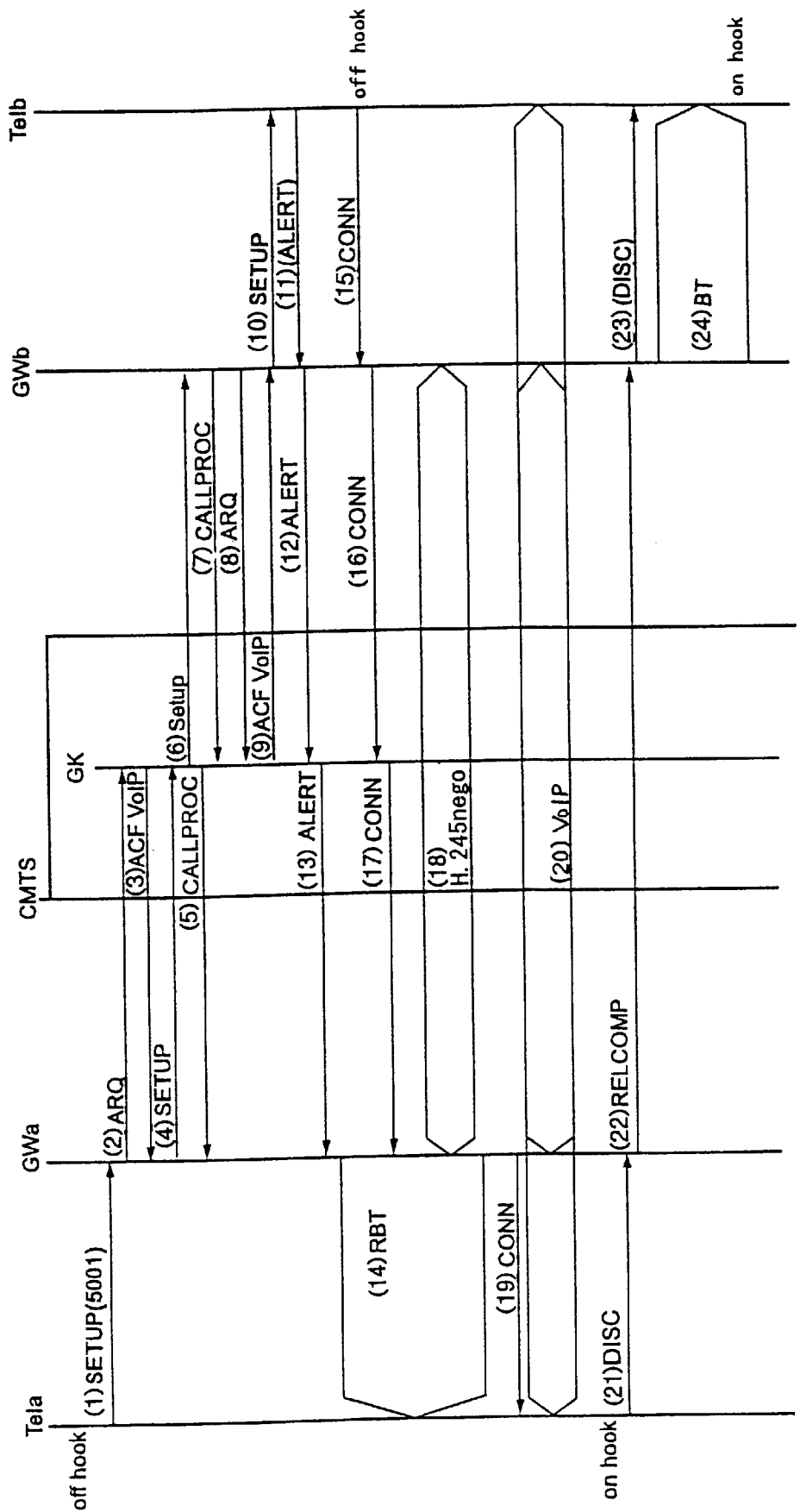
FIG. 8 is a sequence chart of a connecting operation of a cable modem system shown in FIG. 5 in accordance with H.323.

If the dial number "2222" is not registered in the table 41, an ARJ message is sent to the gateway apparatus 34 by providing a reason for the rejection in a called party not registered field of the ARJ message (this process is not shown in the sequence chart of FIG. 7).

If the dial number "2222" is registered in the table 41, the gate keeper 28 sends an ACF_CM message to the gateway apparatus 43 after providing the IP address in a dest call signal address field of the ACF_CM message and providing the user name in a nonstandard parameter field of the ACF_CM message ((3)ACF_CM).

Upon receipt of the ACF_CM message, the gateway apparatus 43 registers or updates the user name and the IP address corresponding to the dial number "2222" in the table 49 which stores the user name and the IP address by relating to each other as shown in FIG. 10. After the registration or update, the gateway apparatus 43 sends to the terminal unit (personal computer) 35 a CONN message which represents completion of the connection ((4)CONN).

Upon receipt of the CONN message, the terminal unit 35 sends to the gateway apparatus 43 a PPP LCP message to start a negotiation of a link control protocol (LCP) to establish a link in accordance with the standard protocol PPP ((5)PPP LCP). Upon receipt of the PPP LCP message, the gateway apparatus 43 sends the PPP LCP message to the terminal unit 35 ((6)PPP LCP), and the negotiation is ended.

After the negotiation of the LCP is completed, the terminal unit 35 sends to the gateway apparatus 43 a PPP Auth message which is information regarding attestation including the user name and the password in order to perform the attestation ((7)PPP Auth). Upon receipt of the PPP Auth message, the gateway apparatus 43 searches the table 49 for the IP address of the access server 24 in accordance with the received user name. Then, the gateway apparatus 43 starts a negotiation to establish an IP tunneling between the gateway apparatus 43 and the access server 24 ((8)TNL OPEN).

After the negotiation is completed and the IP tunneling is established, the gateway apparatus 43 sends to the access server 24 a TNL_PPP Auth message which is information regarding attestation ((9)TNL PPP Auth). Upon receipt of the TNL_PPP Auth message, the acces server 24 performs attestation by using the user name and the password included in the TNL_PPP Auth message, and sends the result of attestation to the gateway apparatus 43 as the TNL_PPP Auth message ((10)TNL PPP Auth). Then, the gateway apparatus 43 sends the PPP Auth message to the terminal unit 35 ((11)PPP Auth), and, thereby, an up-link is established.

Thereafter, the IP packet output from the terminal unit 35 is sent to Internet via the gateway apparatus 43, the CATV transmission path 20 and the access server 24 ((12)PPP IP, (13)TNL PPP IP, (14)IP). Additionally, the IP packet sent from Internet is sent to the terminal unit 35 via the access server 24, the CATV transmission path 20 and the gateway apparatus 43 ((15)IP, (16)TNL PPP IP, (17)PPP IP). By repeating the above-mentioned sequence, the Internet connection is established.

After the user operates the terminal unit 35 to disconnect the Internet connection, the terminal unit 35 sends a disconnect (DISC) message to the gateway apparatus 43 ((18)DISC). Upon receipt of the DISC message, the gateway apparatus 43 disconnects the IP tunneling between the gateway apparatus 43 and the access server 24 ((19)TNL CLOSE). It should be noted that the gateway apparatus 43 disconnects the IP tunneling when the link of the LCP is disconnected.

A description will now be given of a relay of the IP packet during an up link and a down link are established. When sending the IP packet to Internet, the terminal unit 35 produces the PPP_IP packet by encapsulating the IP packet by the point-to point protocol (PPP), and sends the PPP_IP packet to the gateway apparatus 43. Then, the gateway apparatus 43 encapsulate the PPP_IP packet to produce a TNL_PPP_IP packet so as to use a tunneling function, and sends the TNL_PPP_IP packet to the access server 24.

The access server 24 removes the encapsulation of the received TNL_PPP_IP packet by the tunneling and PPP function, and sends only the IP packet to Internet.

When the IP packet is sent from Internet, the access server 24 produces the PPP_IP packet by encapsulating the IP packet by the point-to point protocol (PPP), and encapsulates the PPP_IP packet to produce a TNL_PPP_IP packet so as to use a tunneling function. The thus-produced TNL_PPP_IP packet is sent to the gateway apparatus 43. Then, the gateway apparatus 43 removes the encapsulation of the received TNL_PPP_IP packet by the tunneling and PPP function, and sends the PPP_IP packet to the terminal unit 35. The terminal unit 35 removes the encapsulation of the received PPP_IP packet so as to obtain the IP packet.

A description will now be given, with reference to FIG. 8, of a connection according to H.323. FIG. 8 is a sequence chart of a connecting operation performed by the cable modem system shown in FIG. 5 in accordance with the ITU-T recommendation H.323. It is supposed that the cable modem 31 is not provided to the subscriber unit 30, and a telephone (Tel) is directly connected to the gateway apparatus 43. Additionally, two sets of the pair of gateway apparatus 43 and the telephone are provided. Thus, in order to distinguish one set from the other set in FIG. 8, one set is provided with suffix a and the other set is provided with suffix b.

A description will now be given of a case in which a user (subscriber) connect the telephone a to the telephone b. The user first make a call to the gateway apparatus 43 by dialing the dial number "5001" ((1)SETUP(5001)). Upon receipt of the dial number "5001" sent from the telephone a, the gateway apparatus 43a sends an ARQ message to the gate keeper 28 so as to inquire the IP address of the gateway apparatus 43b or the gate keeper 28 managing the gateway apparatus 43b and reserve a communication band ((2)ARQ).

Upon receipt of the ARQ message, the gate keeper 28 searches the table 41 for the user name and the IP address corresponding to the dial number "5001". The table 41 stores dial numbers, user names and IP addresses by relating to each other.

If the dial number "5001" is not registered in the table 41, the gate keeper 28 sends an ARJ message to the gateway apparatus 43a by providing the reason for rejection in a called party not registered field of the ARJ message. Additionally, when the communication band cannot be reserved, the gate keeper 28 sends the ARJ message to the gateway apparatus 43a by providing the reason for rejection in a request denied field of the ARJ message (These processes are not shown in FIG. 8).

On the other hand, if the dial number is registered in the table 41 and the necessary communication band can be reserved, the gate keeper 28 sends an ACF_VoIP message to the gateway 43a. The ACF_VoIP message is prepared by providing the IP address in a dest call signal address field and rendering a nonstandard parameter field to be empty since the dial number does not designate the telco remote access concentrator or the access server 24 and the user name is not provided in the table 41.

It should be noted that when the gateway apparatuses 43a and 43b are controlled by the same gate keeper 28 and the gate keeper 28 controls a call signal by a routing mode, the IP address included in the ACF_VoIP message is replaced with the IP address of the gate keeper 28. Additionally, when the gateway apparatuses 43a and 43b are controlled by different gate keepers 28 and the gate keepers 28 control a call signal by a direct signaling mode, the IP address of the gateway apparatus 43b is included in the ACF_VoIP message without change.

Upon receipt of the ACF_VoIP message, the gateway apparatus 43a sends a call setting signal (SETUP) to the gate keeper 28 ((4)SETUP). Then, the gate keeper 28 sends to the gateway apparatus 43a a CALLPROC which indicates the reception of the call setup signal ((5)CALLPROC). At the same time the gate keeper 28 sends a SETUP signal to the gateway apparatus 43b ((6)SETUP). Upon receipt of the SETUP signal, the gateway apparatus 43b sends a CALL-PROC signal to the gate keeper 28 ((7)CALLPROC).

The gateway apparatus 43b sends to the gate keeper 28 an ARQ message to the gate keeper 28 so as to inquire the IP address corresponding to the received address (dial number) which is information regarding the received SETUP signal and to reserve a communication band ((8)ARQ). Upon receipt of the ARQ message from the gateway apparatus 43b, the gate keeper 28 searches the table 41 for the user name and the IP address corresponding to the received address. The gate keeper 28 performs the above-mentioned process based on the result of search, and sends an ACF_VoIP message to the gateway apparatus 43b ((9)ACF VoIP).

Upon receipt of the ACF_VoIP message, the gateway apparatus 43b sends a SETUP signal to call the telephone Telb ((10)SETUP). The telephone Telb sends an ALERT message to the gateway apparatus 43a via the gateway apparatus 43b and the gate keeper 28 ((11)ALERT, (12)ALERT, (13)ALERT). When the gateway apparatus 43a receives the ALERT message, a negotiation according to the ITU-T recommendation H.245 is started between the gateway apparatus 43a and the gateway apparatus 43b ((18)H.245nego). After completion of the negotiation, a CONN signal is sent from the gateway apparatus 43a to the telephone Tela ((19)CONN). At this time, an RBT signal which has been sent to the telephone Tela is stopped.

Thereafter, a telephone communication between the telephones Tela and Telb is achieved by a voice over IP (VoIP) message being relayed via the gateway apparatuses 43a and 43b. When the handset of the telephone Tela is on hooked and the telephone communication is disconnected, a disconnect (DISC) message is sent from the telephone Tela to the gateway apparatus 43a ((21)DISC). Then, the gateway apparatus 43a sends a RELCOMP message to the gateway apparatus 43b so as to announce that the communication with the telephone Tela is disconnected ((22)RELCOMP). Upon receipt of the RELCOMP message, the gateway apparatus 43b sends a DISC message to the telephone Telb ((23)DISC), and sends a busy tone signal (BT) to the telephone Telb ((24)BT).

Figure 12:
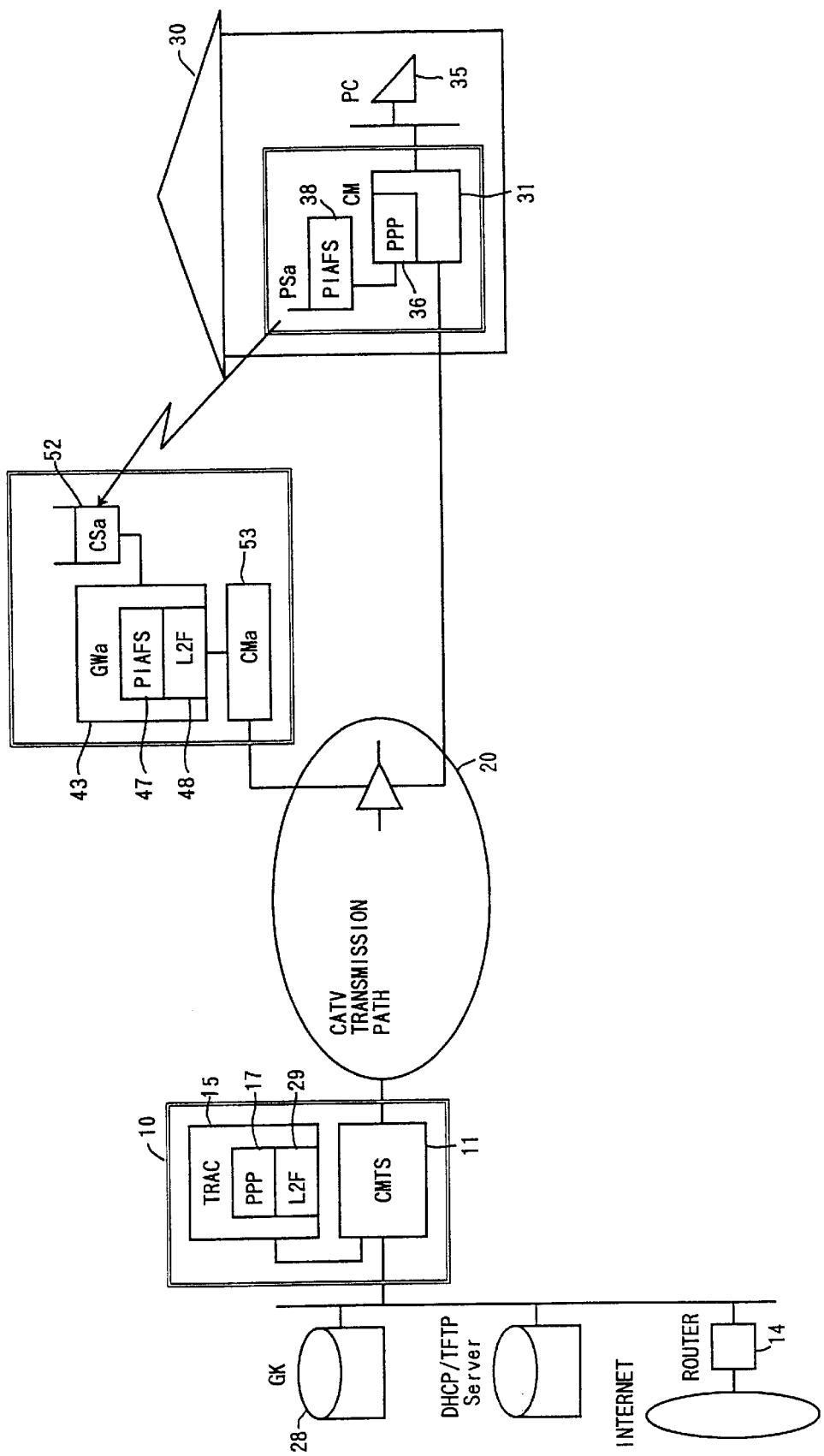
FIG. 12 is a structural diagram of a cable modem system according to a second embodiment of the present invention.

A description will now be given, with reference to FIG. 12, of a second embodiment of the present invention. FIG. 12 is a structural diagram of a cable modem system according to the second embodiment of the present invention. In FIG. 12, parts that are the same as the parts shown in FIG. 5 are given the same reference numerals, and descriptions thereof will be omitted.

The cable modem system according to the present invention uses a personal handyphone system using the PIAFS method for a telco return line as an up link. Additionally, the cable modem system according to the present invention uses the L2F method as a tunneling function. Additionally, a line end terminal function of the gateway apparatus 43 is divided into a CS 52 which is a PHS antenna compatible with PIAFS and a PIAFS function unit 47.

The cable modem function is constituted by a cable modem using the 2-way method which is provided outside the gateway apparatus 43. Thus, the cable modem 53 and the gateway apparatus 43 are connected to each other by a 10BASE-T interface. Additionally, in order to have the telco return function of the subscriber unit 30 to be compatible with the PHS, a PS 38 compatible with the PIAFS is connected to the cable modem 31 via an RS232C interface.

Figure 13B:
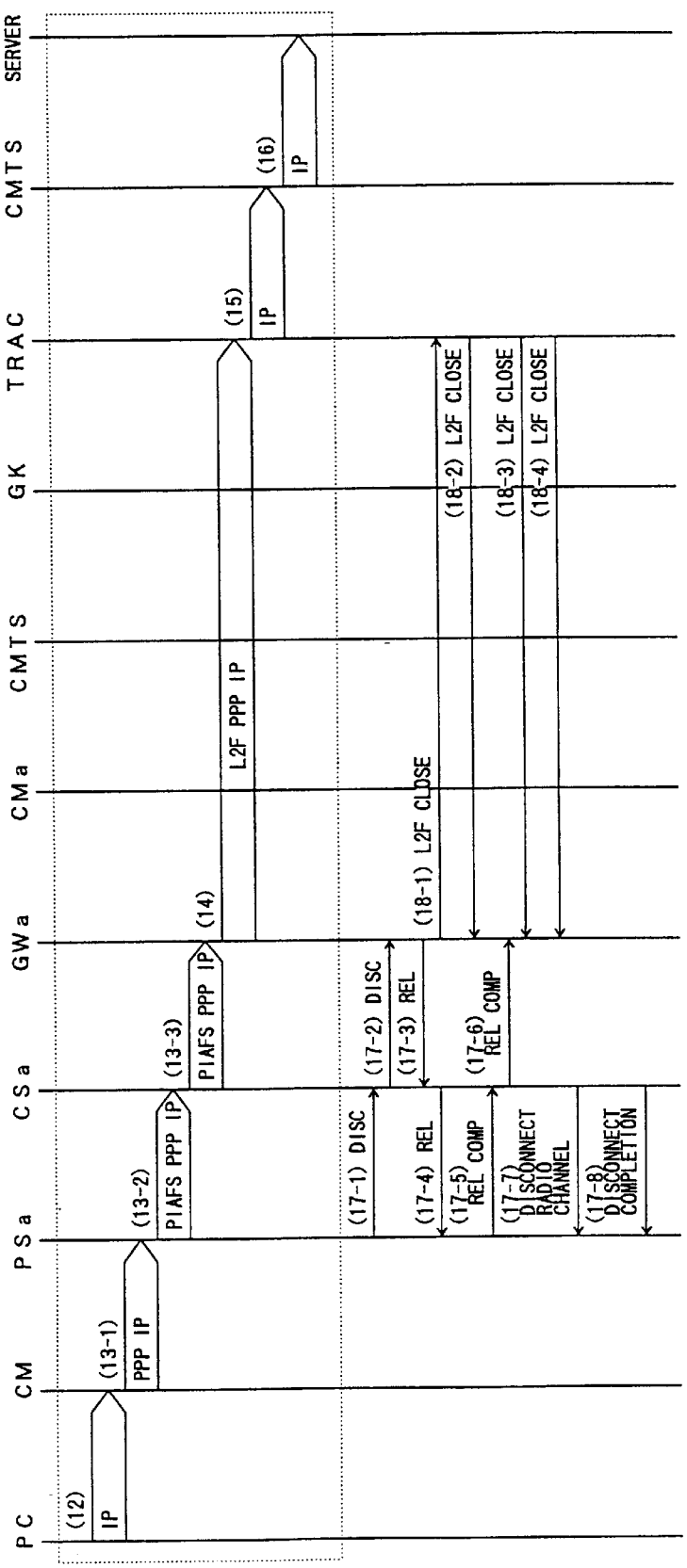

A description will now be given, with reference to FIGS. 13A and 13B, of an operation of the cable modem system shown in FIG. 12. FIGS. 13A and 13B are parts of a sequence chart of a telco return operation performed by the cable modem system shown in FIG. 12. In FIGS. 13A and 13B, steps that are the same as the steps shown in FIG. 6 are given the same parenthesized numbers, and descriptions thereof will be omitted. Additionally, steps that are added to the steps shown in FIG. 6 due to a change in the structure of the cable modem system are given the corresponding original numbers with a suffix number attached thereto.

The cable modem system shown in FIG. 12 establishes a PHS radio channel used for the telco return line after the cable modem 36 make a call. The sequence to establish such a PHS radio channel is added to the step of (1)SETUP(1111). Additionally, the cable modem system performs the negotiation in accordance with the L2F method as a tunneling function. The sequence to achieve such a tunneling function is added to the step of (8)TNL OPEN. Further, the cable modem system performs a disconnecting operation for disconnecting the tunneling using a radio channel of a PHS and the L2F method for the tunneling function when the communication line is disconnected. The sequence to achieve such a disconnecting operation is added to the steps of (17)DISC and (18)TNL CLOSE.

Figure 14:
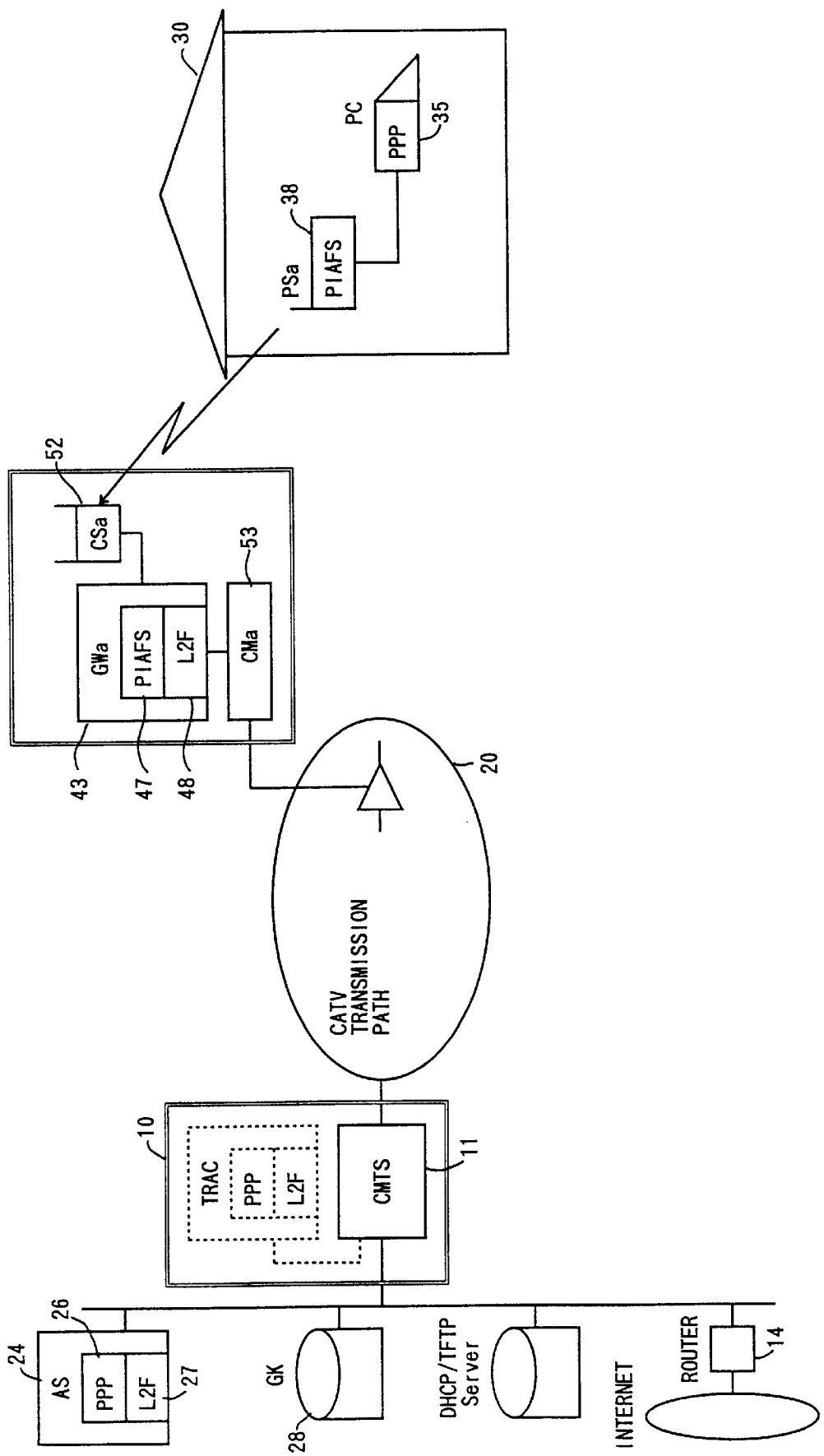
FIG. 14 is a structural diagram of a cable modem system according to a third embodiment of the present invention.

A description will now be given, with reference to FIG. 14, of a third embodiment of the present invention. FIG. 14 is a structural diagram of a cable modem system according to the third embodiment of the present invention. In FIG. 14, parts that are the same as the parts shown in FIG. 5 are given the same reference numerals, and descriptions thereof will be omitted.

The cable modem system according to the present invention uses a personal handyphone system using the PIAFS method for a communication line between the terminal unit 35 and the gateway 43. Additionally, the cable modem system according to the present invention uses the L2F method as a tunneling function. Additionally, the cable modem function is constituted by a cable modem using the 2-way method which is provided outside the gateway apparatus 43. Thus, the cable modem 53 and the gateway apparatus 43 are connected to each other by a 10BASE-T interface. Additionally, in order to have the telco return function of the subscriber unit 30 to be compatible with the PHS, a PS 38 compatible with the PIAFS is connected to the cable modem 31 via an RS232C interface.

Figure 15A:
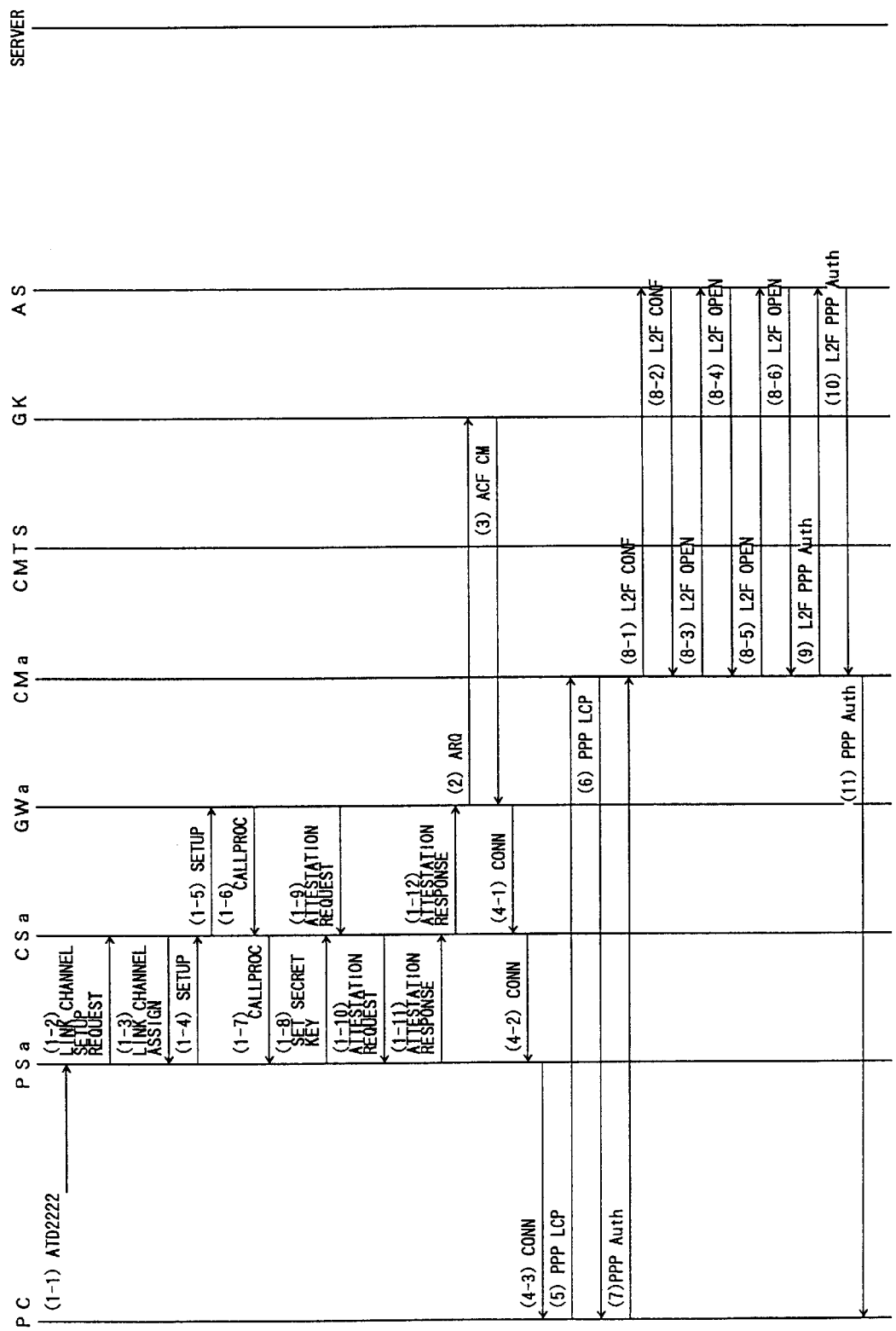
FIGS. 15A and 15B are parts of a sequence chart of a connecting operation by a server of the cable modem system shown in FIG. 14.
Figure 15B:
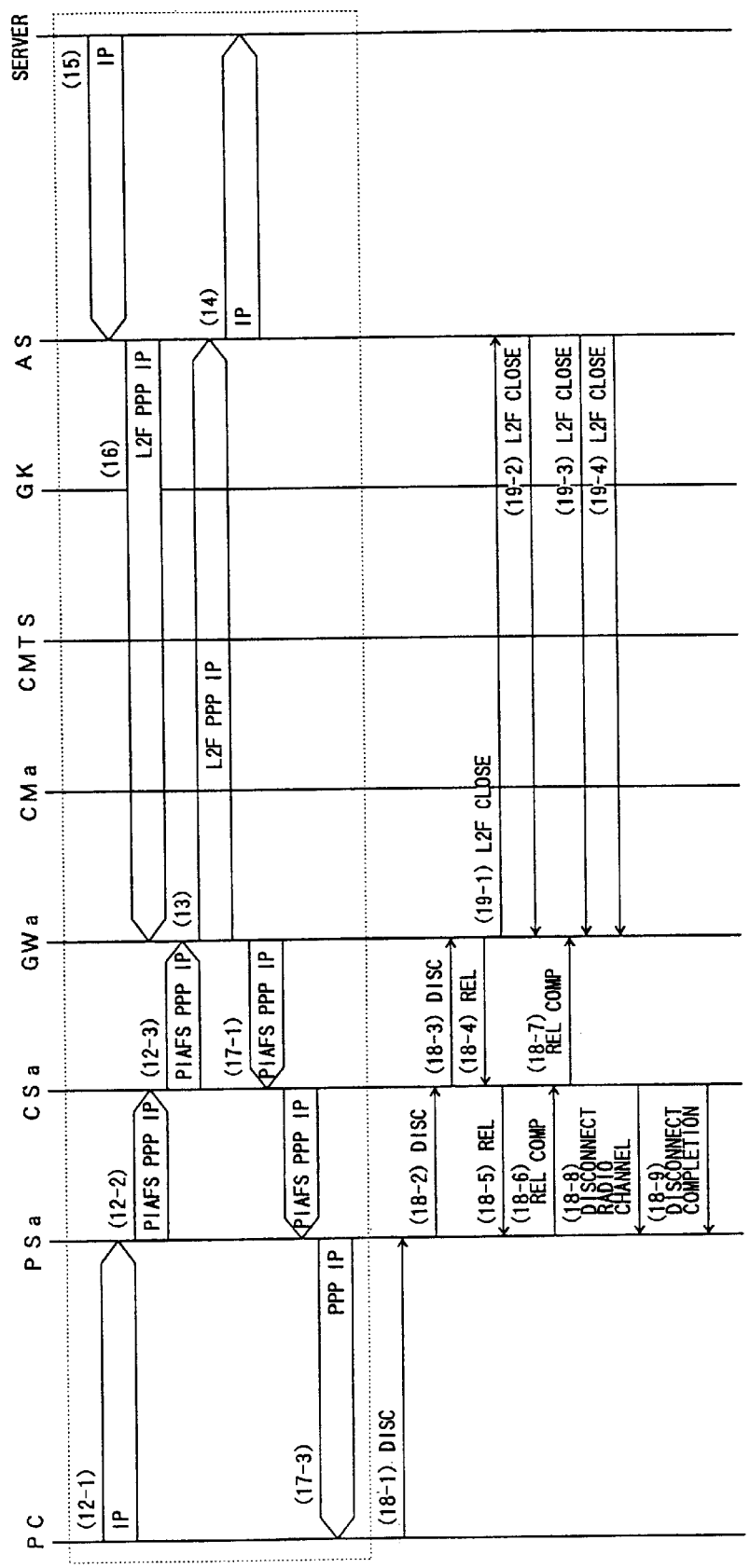

A description will now be given, with reference to FIGS. 15A and 15B, of an operation of the cable modem system shown in FIG. 14. FIGS. 15A and 15B are parts of a sequence chart of a connecting operation performed by the access server of the cable modem system shown in FIG. 14. In FIGS. 15A and 15B, steps that are the same as the steps shown in FIG. 7 are given the same parenthesized numbers, and descriptions thereof will be omitted. Additionally, steps that are added to the steps shown in FIG. 7 due to a change in the structure of the cable modem system are given the corresponding original numbers with a suffix number attached thereto.

The cable modem system shown in FIG. 14 establishes a PHS radio channel used for the telco return line after the terminal unit 35 make a call. The sequence to establish such a PHS radio channel is added to the step of (1)SETUP (2222). Additionally, the cable modem system performs the negotiation in accordance with the L2F method as a tunneling function. The sequence to achieve such a tunneling function is added to the step of (8)TNL OPEN. Additionally, the cable modem system performs communication between the PS 38 and the gateway 43 in accordance with the PIAFS method of the PHS. The sequence to achieve such communication is added to the steps of (12)PPP IP and (17)PPP IP. Further, the cable modem system performs a disconnecting operation for disconnecting the tunneling using a radio channel of a PHS and the L2F method for the tunneling function when the communication line is disconnected. The sequence to achieve such a disconnecting operation is added to the steps of (17)DISC and (18)TNL CLOSE.

A description will now be given, with reference to FIG. 16, of a fourth embodiment of the present invention. FIG. 16 is a structural diagram of a cable modem system according to the fourth embodiment of the present invention. In FIG. 16, parts that are the same as the parts shown in FIG. 5 are given the same reference numerals, and descriptions thereof will be omitted.

The cable modem system according to the present invention uses a personal handyphone system between the subscriber unit 30 and the gateway 43a. The line end terminal function of the gateway apparatus 43a is achieved by a CS 52a which is an antenna of the PHS. Additionally, the cable modem function is provided by a cable modem 53a using the 2-way method which cable modem 53a is externally provided to the gateway apparatus 43a. Thus, the cable modem 53a is connected to the gateway apparatus 43a via a 10BASE-T interface. On the other hand, similar to the subscriber side, a remote party receiving a call from the subscriber is provided with a PS 38b, a CS 52b, a gateway 43b and a cable modem 53b. A communication is performed between the PS 38a and the PS 38b in the above-mentioned cable modem system.

Figure 17A:
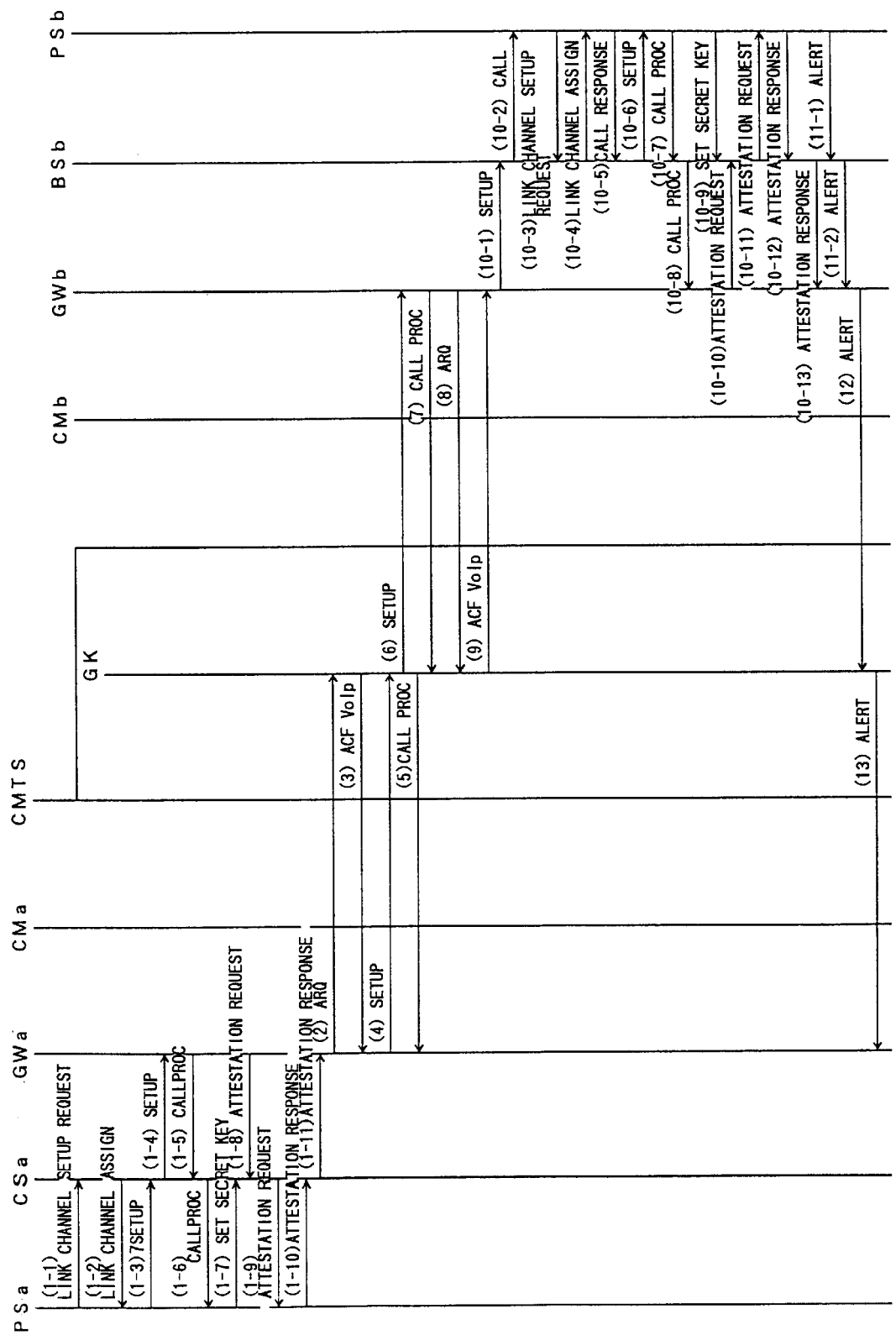
FIGS. 17A and 17B are parts of a sequence chart of a connecting operation of the cable modem system shown in FIG. 12 in accordance with the ITU-T recommendation H.323.
Figure 17B:
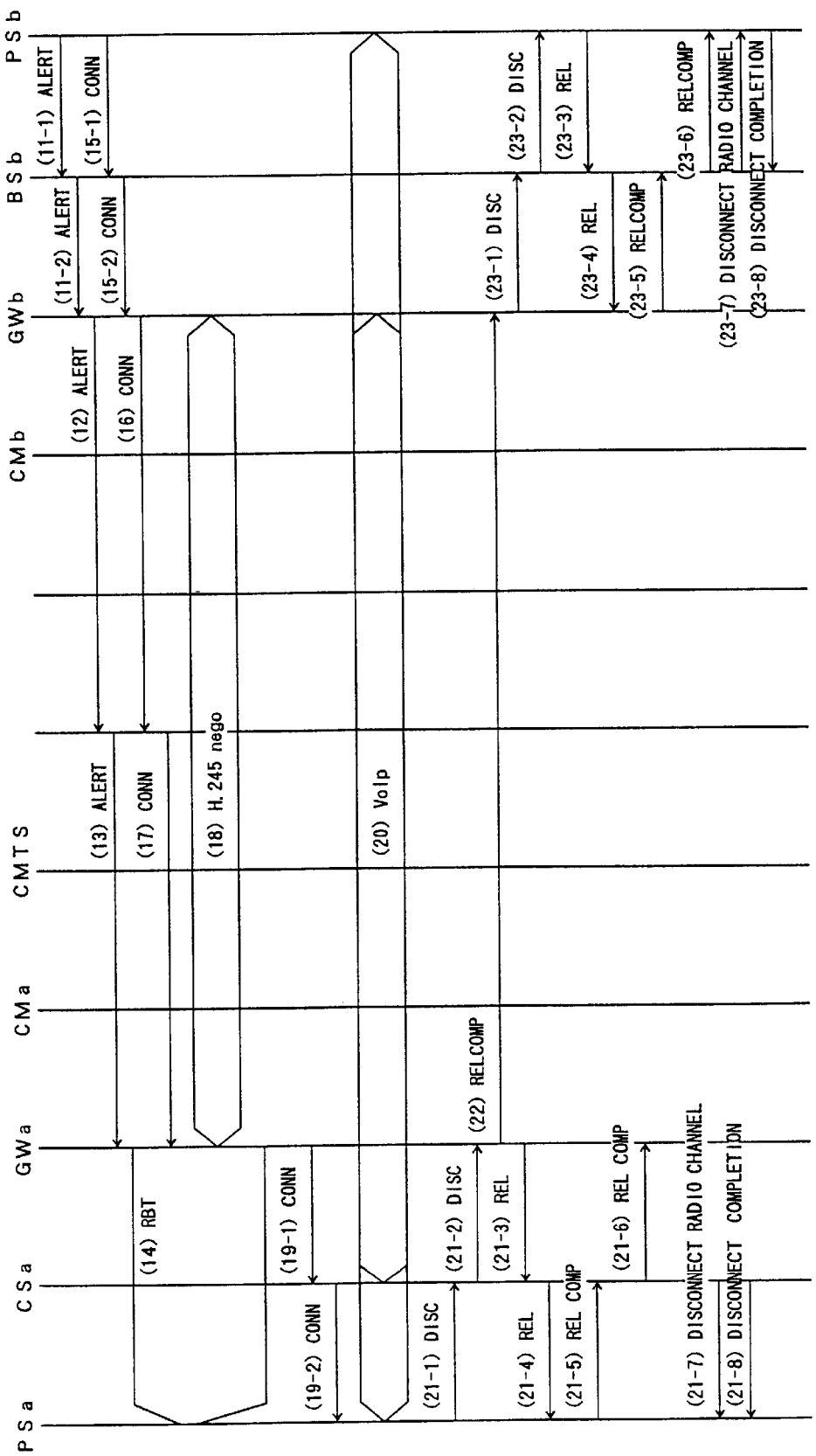
Figure 18:
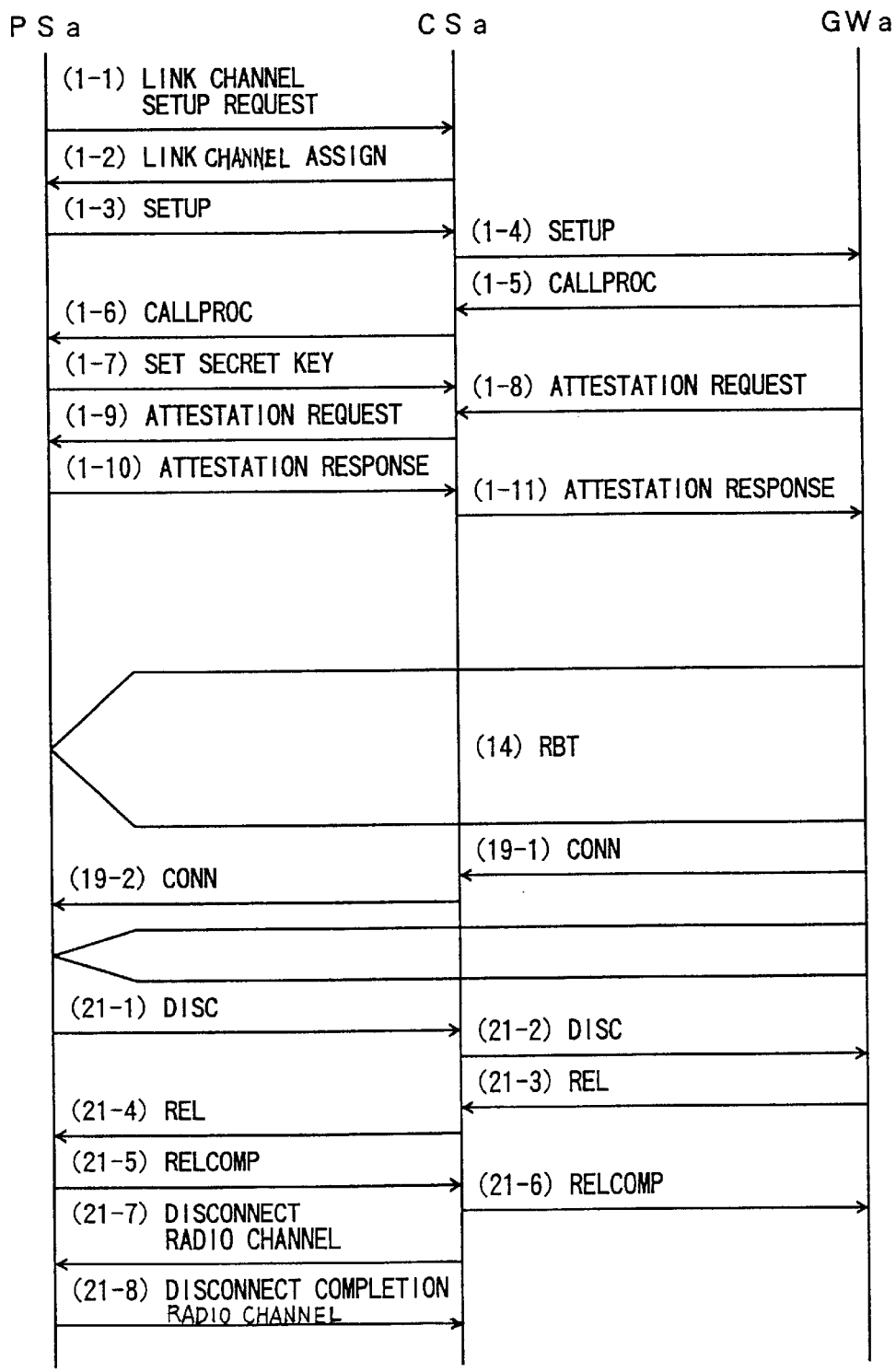
FIG. 18 is a part of the sequence chart shown in FIGS. 17A and 17B.
Figure 19:
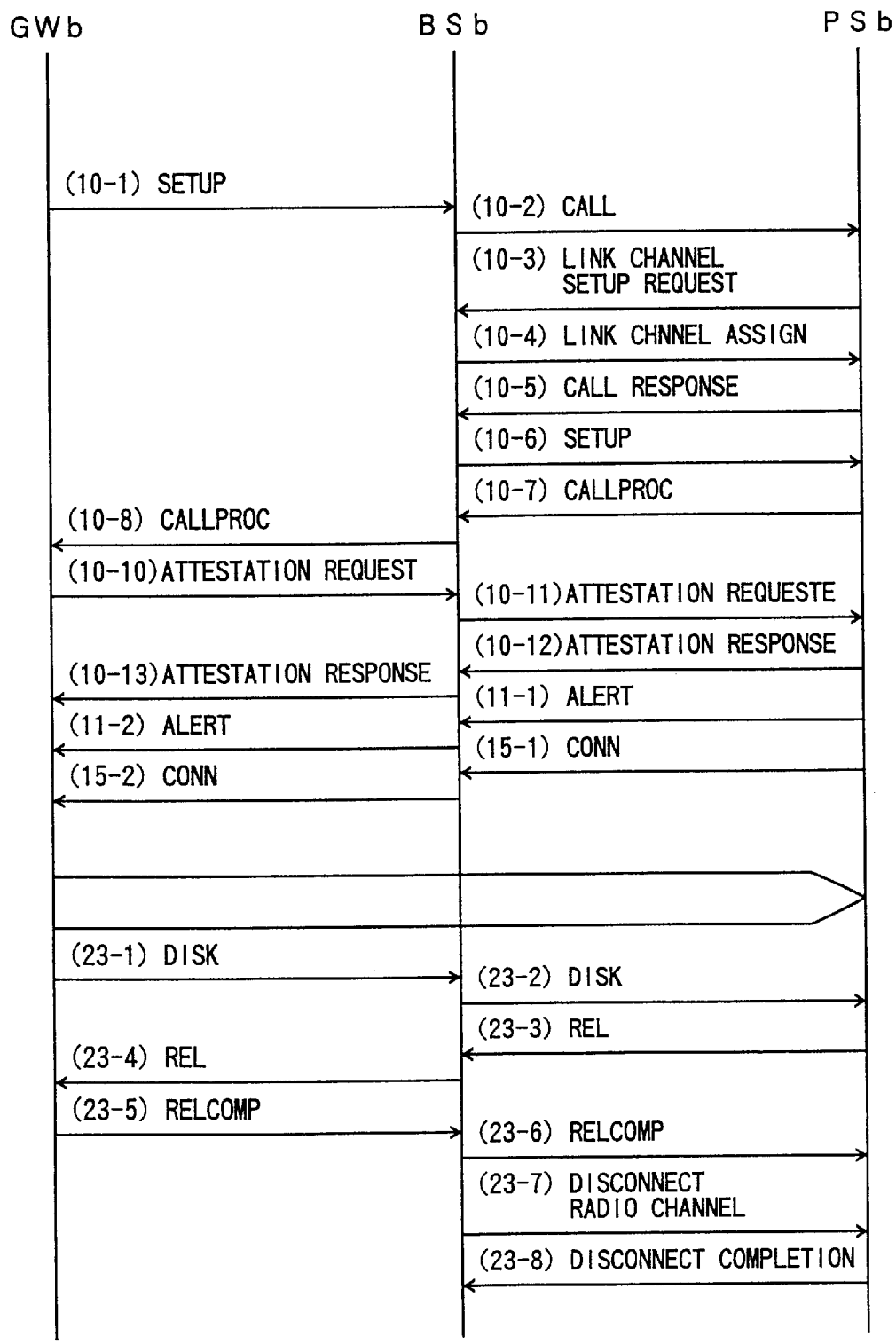
FIG. 19 is a part of the sequence chart shown in FIGS. 17A and 17B.

A description will now be given, with reference to FIGS. 17A, 17B, 18 and 19, of an operation of the cable modem system shown in FIG. 16. FIGS. 17A and 17B are parts of a connecting operation performed in the cable modem system shown in FIG. 16 which connecting operation is in accordance with the ITU-T recommendation H.323. FIG. 18 and 19 are parts of the sequence chart shown in FIGS. 17A and 17B. In FIGS. 17A, 17B, 18 and 19, steps that are the same as the steps shown in FIG. 8 are given the same parenthesized numbers, and descriptions thereof will be omitted. Additionally, steps that are added to the steps shown in FIG. 8 due to a change in the structure of the cable modem system are given the corresponding original numbers with a suffix number attached thereto.

In the cable modem system shown in FIG. 16, a PHS radio channel is established when the PS 38a make a call. The sequence to establish such a PHS radio channel is added to the step of (1)SETUP(5001). Additionally, a PHS radio channel is also established by the PS 38b so as to receive the call from the PS 38a. The sequence to achieve such a PHS radio channel is added to the step of (10)SETUP. Further, a disconnecting operation must be performed so as to disconnect the established PHS radio channel. The sequence to achieve such a disconnecting operation is added to each of the steps of (21)DISC and (23)DISC.

The present invention is not limited to the specifically disclosed embodiments, and variations and modifications may be made without departing from the scope of the present invention.

The present application is based on Japanese priority application No. 10-362915 filed on Dec. 21, 1998, the contents of which are hereby incorporated by reference.

What is claimed is:

1. A cable modem system performing data communication using a transmission path of a cable television system which includes a cable television station apparatus and a plurality of subscriber units connected to each other by the transmission path, the cable modem system comprising:

a gateway apparatus receiving an original data signal supplied by one of the subscriber units via a telephone network, said gateway apparatus converting the original data signal into a converted data signal so that the converted data signal complies with a protocol corresponding to a destination address included in the original data signal, said gateway apparatus sending the converted data signal to said cable television station apparatus via said transmission path; and a line end terminal unit, provided in said cable television station apparatus, receiving the converted data signal sent from said gateway apparatus via said transmission path, said line end terminal unit restoring the converted data signal to the original data signal.

2. The cable modem system as claimed in claim 1, wherein said gateway apparatus includes a first table unit storing information regarding dial numbers and destination addresses of the original data signal by relating to each other, the dial numbers being used when the original data signal is supplied from said one of the subscriber units via the telephone network; and said gateway apparatus retrieves the destination address corresponding to the dial number from said first table unit so as to convert the original data signal into the converted data signal so that the converted data signal complies with a protocol based on the destination address and send the converted data signal to said cable television station apparatus via said transmission path.

3. The cable modem system as claimed in claim 2, wherein said gateway apparatus includes:

a first line end terminal function unit receiving the original data signal supplied by one of the subscriber units via the telephone network;

a first tunneling function unit applying a process to the converted data signal to be transmitted via said transmission path of said cable television system so as to use a tunneling function; and a cable modem function unit sending the converted data signal supplied by said first tunneling function unit to said cable television station apparatus via said transmission path of said cable television system.

4. The cable modem system as claimed in claim 3, wherein said line end terminal unit of said cable television station apparatus comprises:

a second line end terminal function unit receiving the converted data signal sent from said gateway apparatus via said transmission path;

a second tunneling function unit applying a process to the converted data signal received from said gateway apparatus so as to restore the converted data signal from the converted data signal processed by said first tunneling function unit; and a telco return protocol unit restoring the original data signal from the converted data signal.

5. The cable modem system as claimed in claim 4, wherein said cable television station apparatus includes an access server performing a connection in accordance with a dial up method.

6. The cable modem system as claimed in claim 5, wherein said access server comprises:

a third tunneling function unit applying a process to the converted data signal received from said gateway apparatus so as to restore the converted data signal from the converted data signal processed by said first tunneling function unit; and a protocol function unit restoring the original data signal from the converted data signal.

7. The cable modem system as claimed in claim 6, wherein the telephone network connecting said subscriber units to said gateway apparatus is a personal handyphone system network.

8. The cable modem system as claimed in claim 4, wherein said cable television station apparatus includes a gate keeper unit storing the dial numbers, user names and the destination addresses by relating to each other.

9. The cable modem system as claimed in claim 8, wherein said gate keeper unit includes a second table unit storing the dial numbers, the user names and the destination addresses by relating to each other.

10. The cable modem system as claimed in claim 9, wherein contents of said first table unit are updated based on contents of said second table unit.

11. The cable modem system as claimed in claim 10, wherein the telephone network connecting said subscriber units to said gateway apparatus is a personal handyphone system network.

12. The cable modem system as claimed in claim 4, wherein the telephone network connecting said subscriber units to said gateway apparatus is a personal handyphone system network.

13. The cable modem system as claimed in claim 12, wherein said first line end terminal function unit includes a PIAFS function unit for using a function according to the PHS internet access forum standard in a data transmitting operation through the telephone network connecting said one of the subscriber units to said gateway apparatus.

14. The cable modem system as claimed in claim 2, wherein said gateway apparatus comprises:

a first line end terminal function unit receiving the original data signal from said one of the subscriber units via the telephone network;

a first H.323 function unit performing a process for using a function according to the ITU-T recommendation H.323 so as to convert the original data signal to the converted data signal; and a cable modem function unit sending the converted data signal supplied from said first H.323 function unit to said cable television station apparatus via said transmission path of said cable television system.

15. The cable modem system as claimed in claim 14, wherein said cable television station apparatus includes a gate keeper unit so as to use the function according to the ITU-T recommendation H.323.

16. The cable modem system as claimed in claim 15, wherein the telephone network connecting said subscriber units to said gateway apparatus is a personal handyphone system network.

17. The cable modem system as claimed in claim 15, wherein said first line end terminal function unit includes a PIAFS function unit for using a function according to the PHS internet access forum standard in a data transmitting operation through the telephone network connecting said one of the subscriber units to said gateway apparatus.

18. The gateway apparatus as claimed in claim 1, including:

a first table unit storing information regarding a dial number and a destination address of the original data signal, the dial number being used when the original data signal is supplied from said one of the subscriber units via the telephone network; and said gateway apparatus retrieves the destination address corresponding to the dial number from said first table unit so as to convert the original data signal into the converted data signal so that the converted data signal complies with a protocol corresponding to the destination address and send the converted data signal to said cable television station apparatus via said transmission path.

19. The gateway apparatus as claimed in claim 18, further comprising:

a first line end terminal function unit receiving the original data signal from said one of the subscriber units via the telephone network;

a first H.323 function unit performing a process for using a function according to the ITU-T recommendation H.323 so as to convert the original data signal to the converted data signal; and a cable modem function unit sending the converted data signal supplied from said first H.323 function unit to said cable television station apparatus via said transmission path of said cable television system.

20. A gateway apparatus provided along an up-link of a cable modem system which performs data communication using a transmission path of a cable television system which includes a cable television station apparatus and a plurality of subscriber units connected to each other by the transmission path, said gateway apparatus receiving an original data signal supplied by one of the subscriber units via a telephone network, said gateway apparatus converting the original data signal into a converted data signal so that the converted data signal complies with a protocol corresponding to a destination address included in the original data signal, said gateway apparatus sending the converted data signal to said cable television station apparatus via said transmission path.

* * * * *